(12) United States Patent
Montemurro et al.

(10) Patent No.: US 8,929,346 B2
(45) Date of Patent: *Jan. 6, 2015

(54) ADVERTISEMENT AND DISTRIBUTION OF NOTIFICATIONS IN A WIRELESS LOCAL AREA NETWORK (WLAN)

(75) Inventors: Michael Peter Montemurro, Toronto (CA); Stephen McCann, Southampton (GB)

(73) Assignee: Blackberry Limited, Waterloo, Ontario (CA)

( * ) Notice: Subject to any disclaimer, the term of this patent is extended or adjusted under 35 U.S.C. 154(b) by 560 days.

This patent is subject to a terminal disclaimer.

(21) Appl. No.: 12/780,603

(22) Filed: May 14, 2010

(65) Prior Publication Data

US 2011/0280229 A1 Nov. 17, 2011

(51) Int. Cl.
*H04W 4/00* (2009.01)
*H04Q 11/00* (2006.01)
*H04L 29/06* (2006.01)
*H04W 48/08* (2009.01)
*H04W 4/22* (2009.01)
*H04W 76/00* (2009.01)

(52) U.S. Cl.
CPC .............. *H04W 48/08* (2013.01); *H04W 4/22* (2013.01); *H04W 76/007* (2013.01)
USPC ......... 370/338; 370/270; 370/312; 455/414.3

(58) Field of Classification Search
CPC ... H04W 4/206; H04W 68/005; H04W 68/10; H04W 68/12
USPC .................. 370/270, 312, 338, 390, 432; 455/414.3, 512; 340/541; 725/97; 713/168
See application file for complete search history.

(56) References Cited

U.S. PATENT DOCUMENTS 6,493,561 B1 * 12/2002 Hasegawa .................. 455/512
7,065,645 B2 * 6/2006 Teicher ....................... 713/167
(Continued)

FOREIGN PATENT DOCUMENTS

EP 2 076 090 A1 7/2009
EP 2 093 967 A2 8/2009
(Continued)

OTHER PUBLICATIONS

International Preliminary Report on Patentability dated Nov. 20, 2012 for corresponding International Application No. PCT/IB2011/001006, 10 pages.

(Continued)

*Primary Examiner* — Un C Cho
*Assistant Examiner* — Jeremy Costin
(74) *Attorney, Agent, or Firm* — Brinks Gilson & Lione

(57) ABSTRACT

An Access Point (AP) advertises the availability of notifications, and this advertisement may be received and interpreted by stations (STAs), both by associated STAs and by non-associated STAs. Upon being informed of the availability of the notification message, a STA may take action in order to receive the notification message from the AP. Alternatively, the STA may be able to identify the notification message by analyzing the advertisement. If the contents of the notification message comprise a control message, the STA may act on the control message in a way that influences the STA's behavior. If the contents of the notification message indicate restrictions imposed by the AP, the STA may determine, in view of the restrictions, not to attempt association with the AP.

7 Claims, 20 Drawing Sheets

(56) References Cited

U.S. PATENT DOCUMENTS

| | | | |
|---|---|---|---|
| 7,151,764 | B1 | 12/2006 | Heinonen et al. |
| 7,277,932 | B2 | 10/2007 | Adachi et al. |
| 7,606,209 | B2 | 10/2009 | Watanabe |
| 7,683,773 | B1 | 3/2010 | Goodall et al. |
| 2003/0134636 | A1 | 7/2003 | Sundar et al. |
| 2003/0217168 | A1 | 11/2003 | Adachi et al. |
| 2005/0097362 | A1 | 5/2005 | Winget et al. |
| 2005/0210523 | A1* | 9/2005 | Parnell et al. .................... 725/97 |
| 2005/0286456 | A1 | 12/2005 | McNew |
| 2006/0109113 | A1* | 5/2006 | Reyes et al. .................... 340/541 |
| 2007/0124592 | A1 | 5/2007 | Oyama |
| 2008/0141031 | A1 | 6/2008 | Oba et al. |
| 2008/0178277 | A1 | 7/2008 | Oba et al. |
| 2008/0261574 | A1* | 10/2008 | Rinta-Aho et al. ......... 455/414.3 |
| 2008/0270534 | A1 | 10/2008 | Xia et al. |
| 2008/0298333 | A1* | 12/2008 | Seok .............................. 370/338 |
| 2009/0031138 | A1 | 1/2009 | Nakhjiri |
| 2009/0047974 | A1 | 2/2009 | Quinn |
| 2009/0177759 | A1 | 7/2009 | Ogawa et al. |
| 2009/0247111 | A1 | 10/2009 | Sennett et al. |
| 2010/0216434 | A1 | 8/2010 | Marcellino et al. |
| 2010/0275249 | A1 | 10/2010 | McCann et al. |
| 2010/0325714 | A1 | 12/2010 | Iyer et al. |
| 2011/0040969 | A1* | 2/2011 | Yao et al. ...................... 713/168 |
| 2011/0280227 | A1* | 11/2011 | McCann et al. .............. 370/338 |

FOREIGN PATENT DOCUMENTS

| | | |
|---|---|---|
| WO | WO 2007/083824 A1 | 7/2007 |
| WO | WO 2007/103055 A2 | 9/2007 |
| WO | WO 2009/101861 A1 | 8/2009 |

OTHER PUBLICATIONS

International Preliminary Report on Patentability dated Nov. 20, 2012 for corresponding International Application No. PCT/IB2011/001008, 10 pages.

International Preliminary Report on Patentability dated Nov. 20, 2012 for corresponding International Application No. PCT/IB2011/001018, 7 pages.

International Preliminary Report on Patentability dated Nov. 20, 2012 for corresponding International Application No. PCT/IB2011/001023, 6 pages.

EPO Communication regarding Deficiencies in Written Opinion of the International Searching Authority dated Dec. 21, 2012 for corresponding European Application No. 11726170.1, 2 pages.

EPO Communication regarding Deficiencies in Written Opinion of the International Searching Authority dated Dec. 21, 2012 for corresponding European Application No. 11726171.9, 2 pages.

EPO Communication regarding Deficiencies in Written Opinion of the International Searching Authority dated Dec. 21, 2012 for corresponding European Application No. 11726172.7, 2 pages.

EPO Communication regarding Deficiencies in Written Opinion of the International Searching Authority dated Dec. 21, 2012 for corresponding European Application No. 11733699.0, 2 pages.

Hiller, T. et al., "A Container Type for the Extensible Authentication Protocol (EAP)," Network Working Group, Internet-Draft, <draft-hiller-eap-tlv-01.txt>, Internet Engineering Task Force Standard Working Draft, The Internet Society, May 2003, 10 pages.

International Search Report and Written Opinion dated Jul. 27, 2011 for corresponding International Application No. PCT/IB2011/001006, 14 pages.

International Search Report and Written Opinion dated Jul. 27, 2011 for corresponding International Application No. PCT/IB2011/001008, 14 pages.

International Search Report and Written Opinion dated Oct. 5, 2011 for corresponding International Application No. PCT/IB2011/001023, 11 pages.

International Search Report and Written Opinion dated Nov. 28, 2011 for corresponding International Application No. PCT/IB2011/001018, 10 pages.

* cited by examiner

FIG. 5-3

| Element ID | Length | Number of Notifications | Notification Type #1 | Notification Hash #1 | Notification Type #2 (optional) | Notification Hash #2 (optional) | ... | Notification Type #N (optional) | Notification Hash #N (optional) |
|---|---|---|---|---|---|---|---|---|---|
| 82 | 84 | 86 | 88 | 89 | 92 | 93 | | 96 | 97 |
| 1 | 1 | 1 | 1 | fixed | 1 | fixed | ... | 1 | fixed |

Octets:

FIG. 5-4

| Element ID | Length | Notification Type #1 | Notification Hash #1 | Notification Type #2 (optional) | Notification Hash #2 (optional) | ... | Notification Type #N (optional) | Notification Hash #N (optional) |
|---|---|---|---|---|---|---|---|---|
| 82 | 84 | 88 | 89 | 92 | 93 | | 96 | 97 |
| 1 | 1 | 1 | 8 | 1 | 8 | ... | 1 | 8 |

Octets:

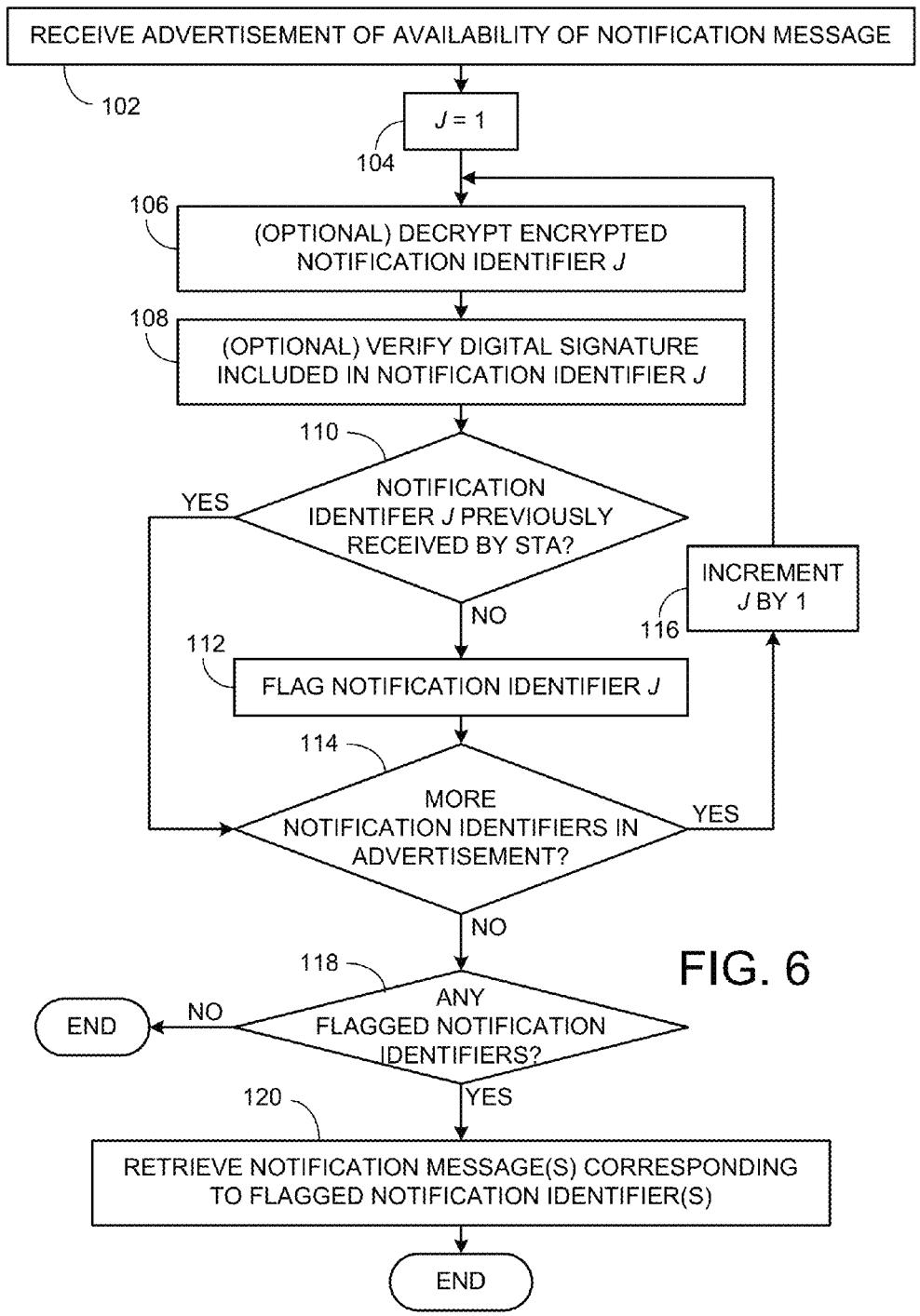

US 8,929,346 B2

ADVERTISEMENT AND DISTRIBUTION OF NOTIFICATIONS IN A WIRELESS LOCAL AREA NETWORK (WLAN)

TECHNICAL FIELD

The technology described herein generally relates to wireless local area networks (WLANs), and more particularly, to the advertisement and distribution of notifications in a WLAN.

BACKGROUND

Wireless communication between wireless terminals (STAs) and infrastructure (Access Points) within a Wireless Local Area Network (WLAN) typically requires a two-state connection process. In the initial non-associate state, a STA may only communicate with the access point (AP), until authentication (if required) and association are complete. In the associated state, the STA has connectivity to an external network (for example, the Internet) and is able to exchange application data with the network. When the AP is secured, the STA in the associated state can establish a security association which allows the STA to exchange protected information with the AP.

The delivery of information from the AP to the STA in the non-associated state is very limited, and information cannot flow from the network to the STA.

BRIEF DESCRIPTION OF THE DRAWINGS

FIGS. 2-1, 2-2, and 2-3 are illustrations of example methods resulting in the addition of a notification to a list of active notifications in an access point (AP);

FIGS. 3, 3-1, 3-2, and 3-3 are illustrations of example methods for advertisement of availability of active notifications;

FIGS. 4-1, 4-2, 4-3, and 4-4 illustrate example formatting information for a notification information element;

FIGS. 5-1, 5-2, 5-3, and 5-4 illustrate alternative example formatting information for a notification information element;

FIG. 6 is an illustration of an example method for handling an advertisement of availability of one or more active notifications;

FIGS. 11-1 and 11-2 are illustrations of example methods for handling a notification message;

FIGS. 16-1 and 16-2 are illustrations of example methods resulting in the addition of a notification to a list of active notifications in an AAA server;

FIGS. 17-1 and 17-2 are illustrations of example methods for advertisement of availability of active notifications in an EAP framework;

FIGS. 18-1 and 18-2 are illustrations of example message flow sequences between a mobile station, a network access server (NAS) and an AAA server;

DETAILED DESCRIPTION

Advertisement and Delivery of Notifications

Figure 1:
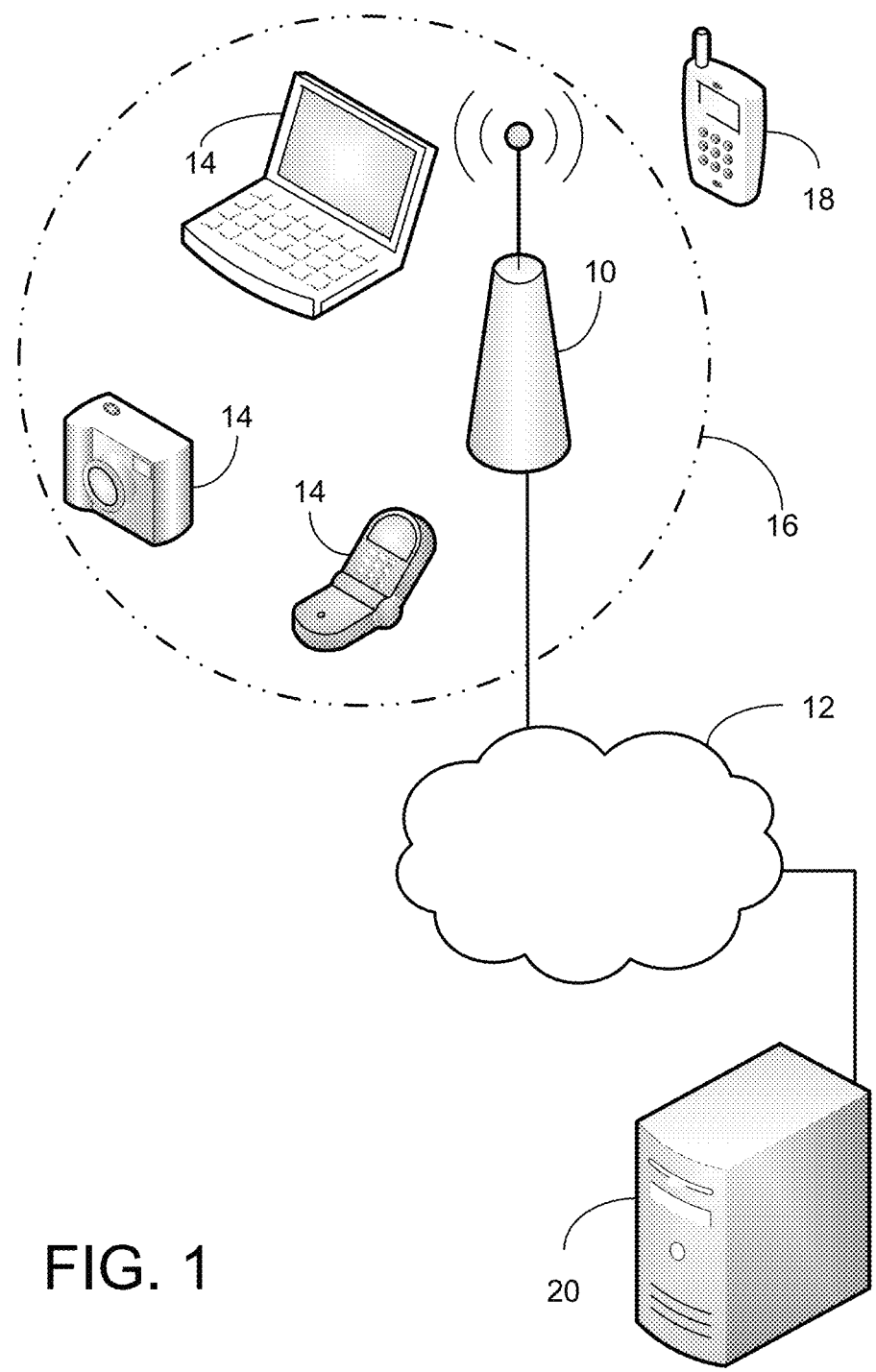
FIG. 1 is an illustration of an example network architecture for notification advertisement and delivery within a wireless local area network (WLAN)

FIG. 1 is an illustration of an example network architecture for notification advertisement and delivery within a wireless local area network (WLAN). The WLAN may be configured using Institute of Electrical and Electronics Engineers (IEEE) Standard 802.11 (IEEE 802.11) technology, or other standards or networks for providing wireless network communications.

In the network architecture shown in FIG. 1, a WLAN access point (AP) 10 is coupled to a network 12, possibly through a wired communication interface, a satellite interface, a Worldwide Interoperability for Microwave Access (WiMAX®) communication interface, or any other suitable communication interface. AP 10 broadcasts beacon frames. Stations 14 are WLAN devices that are within range of AP 10 and are associated with AP 10. AP 10 and stations 14 together form a basic service set (BSS) 16. A station (STA) 18 is within range of AP 10 but is not associated with AP 10. STA 18 is therefore not part of the BSS.

A basic service set identifier (BSSID) identifies BSS 16, and is included in every management frame sent by AP 10 or STAs 14. The MAC address of AP 10 is often used as the BSSID. AP 10 may be able to modify its BSSID. AP 10 may be able to include multiple BSSID values in its management frames, and in that case, the phrase "the BSSID" used in this document means one or more of the multiple BSSID values.

The network to which BSS 16 belongs is identified by its network name, referred to as a service set identifier (SSID). Unless hidden, the SSID is included in certain downlink frames, including, for example, beacon frames and probe response frames transmitted by AP 10.

STA 18 may detect the existence of AP 10 by undergoing a network discovery process to identify the available wireless local area networks. In some cases the network discovery process includes the receipt by STA 18 of beacon frames broadcasted by AP 10. In some cases the network discovery process includes the transmission by STA 18 of a probe request frame and receipt by STA 18 of a probe response frame from AP 10 in response to the probe request frame.

A server 20 is coupled to AP 10 through network 12. It is contemplated that server 20 is local to AP 10. Alternatively, it is contemplated that server 20 is remote to AP 10, and that the coupling of server 20 to AP 10 occurs via other networks in addition to network 12. For example, the coupling of server 20 to AP 10 may occur via the Internet.

As explained in further detail in this disclosure, AP 10 advertises the availability of notifications, and this advertisement may be received and interpreted by associated STAs and by non-associated STAs. Upon being informed of the availability of the notification message, a STA may take action in order to receive the notification message from AP 10. Alternatively, the STA may be able to identify the notification message by analyzing the advertisement. If the contents of the notification message comprise a control message, the STA may act on the control message in a way that influences the STA's behavior. If the contents of the notification message indicate restrictions imposed by the AP, the STA may determine, in view of the restrictions, not to attempt association with the AP.

A notification identifier is used to identify an instance of a notification. Various implementations of notification identifiers are disclosed in this document, and other implementations will be obvious to persons of ordinary skill in the art.

Receipt or Generation or Activation of Notifications

Figures 1, 2:
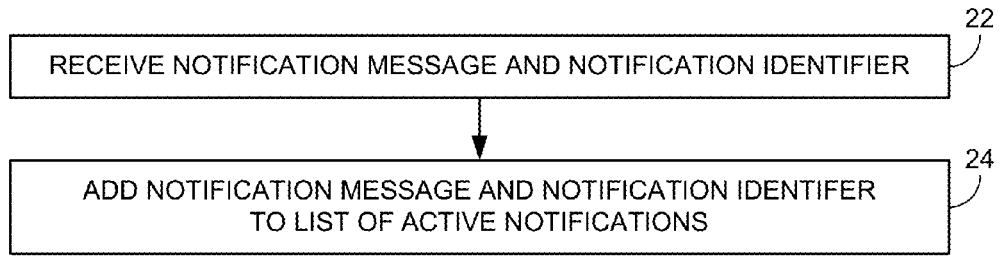
Figure 2:
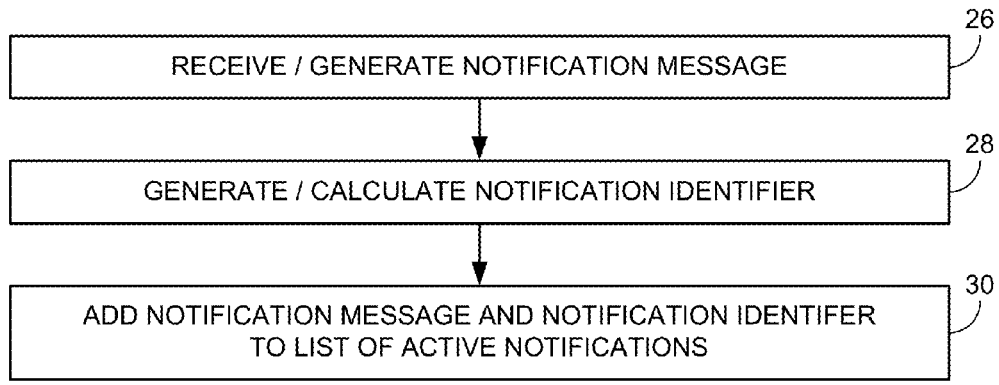
Figures 2, 3:
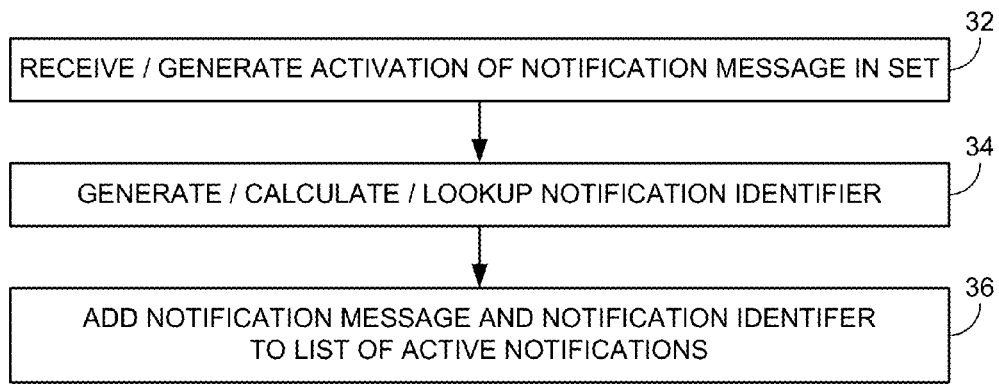
Figure 3:
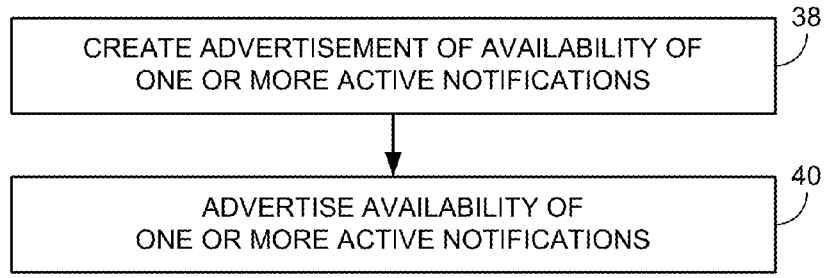
Figures 1, 2, 3:
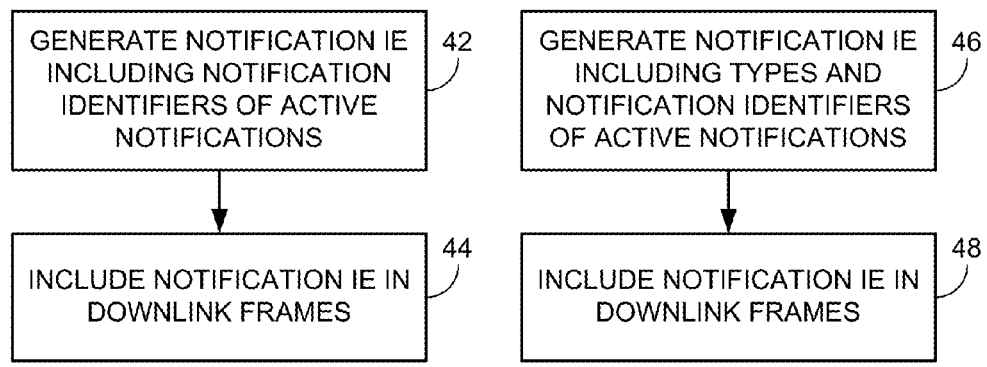
Figure 3:
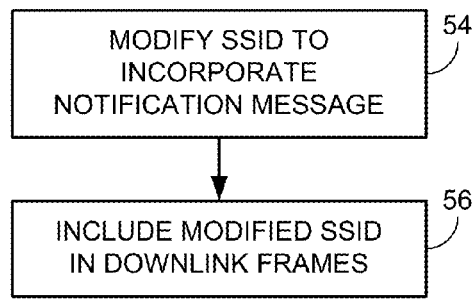

FIGS. 2-1, 2-2 and 2-3 are illustrations of example methods resulting in the addition of a notification to a list of active notifications in an AP. The phrase "active notification" is used to refer to a notification the availability of which is to be advertised. A notification that was previously active and is not longer to be advertised is deemed an "expired notification". It is contemplated that some notifications are permanently active and never expire. The term "list" is used to aid the explanation, and it is contemplated that data structures other than a list may be used by the AP to monitor which notifications are active and hence are to be advertised. Moreover, if only a single notification is active, the data structure may not be in the form of a list.

As illustrated in FIG. 2-1, an AP may receive at 22 a notification message and its notification identifier from an external source, for example, from a server coupled to the AP. At 24, the AP adds the received notification and its notification identifier to the AP's list of active notifications. In the example method illustrated in FIG. 2-1, both the notification message and its notification identifier originate outside of the AP that advertises the availability of the notification. As explained in the detailed discussion of notification identifiers, this enables the source of the notification message to use its own cryptographic information to encrypt the notification identifier or to digitally sign the notification identifier or both. This also enables the source of the notification message to use its own cryptographic information in the generation or calculation of the notification identifier, as in the example described below of a message integrity code (MIC) in the notification identifier.

As illustrated in FIG. 2-2, an AP may receive at 26 a notification message from an external source, for example, from a server coupled to the AP. Alternatively, an AP may generate internally at 26 a notification message. Internal generation of a notification message may involve configuration of the AP by a WLAN administrator, possibly through a notification generation application at the AP. At 28, the AP calculates or otherwise generates a notification identifier for the notification message received or generated at 26, possibly through a notification identifier generation application at the AP. At 30, the AP adds the notification message and its notification identifier to the AP's list of active notifications.

The example method illustrated in FIG. 2-3 applies to a situation where a notification message is from a set of notification messages that are known to the STAs and to the AP. An AP may receive at 32 from an external source, for example, from a server coupled to the AP, an activation of a particular notification message in the set. Alternatively, an AP may generate internally at 32 an activation of a particular notification message in the set. Internal generation of an activation of a particular notification message may involve configuration of the AP by a WLAN administrator, possibly through a notification generation application at the AP. At 34, the AP calculates or otherwise generates a notification identifier for the notification message activated at 32. Alternatively, the AP may have previously calculated or generated or received notification identifiers for the notification messages in the set, and at 34 may simply look up the notification identifier corresponding to the notification message activated at 34. At 36, the AP adds the notification message and its notification identifier to the AP's list of active notifications.

In the example method illustrated in FIG. 2-2, and in the example method illustrated in FIG. 2-3 with the exception of the case where the AP looks up a previously received notification identifier, the notification identifier is calculated or otherwise generated in the AP that advertises the availability of the notification. This enables the AP to use the SSID or the BSSID or both in the generation of the notification identifier, examples of which are described in further detail below. This also enables the AP to use its own cryptographic information to encrypt the notification identifier or to digitally sign the notification identifier or both. This also enables the AP to use its own cryptographic information in the generation or calculation of the notification identifier, as in the example described below of a MIC in the notification identifier.

Advertisement of Active Notifications

FIGS. 3, 3-1, 3-2, and 3-3 are illustrations of example methods for advertisement of availability of one or more active notifications. The example methods are to be performed by an AP, for example, by AP 10.

A generic example method is illustrated in FIG. 3, in which the AP creates at 38 an advertisement of the availability of one or more active notifications, and the AP advertises the advertisement at 40, thus advertising the availability of the one or more active notifications. Different forms for the advertisement are discussed in this document, and other forms for the advertisement are contemplated and will be obvious to those of ordinary skill in the art.

In the example method illustrated in FIG. 3-1, the advertisement is in the form of a notification information element (IE). The AP generates a notification IE at 42, where the notification IE includes notification identifiers of the active notifications in the AP's list of active notifications. At 44, the AP includes the notification IE in downlink frames, for example, in beacon frames and in probe response frames. Presence of the notification IE in the downlink frame is an indication to STAs receiving the downlink frame that at least one notification message is available. Lack of presence of the notification IE in the downlink frame is an indication to STAs receiving the downlink frame that either the AP sending the downlink frame does not support the advertisement and delivery mechanism, or the AP sending the downlink frame supports the advertisement and delivery mechanism and there are no active notifications at this time for the AP to advertise. As part of the process of generating a beacon frame and as part of the process of generating a probe response frame, the AP may regenerate the notification IE to reflect the current state of the list of active notifications.

Figures 1, 4:
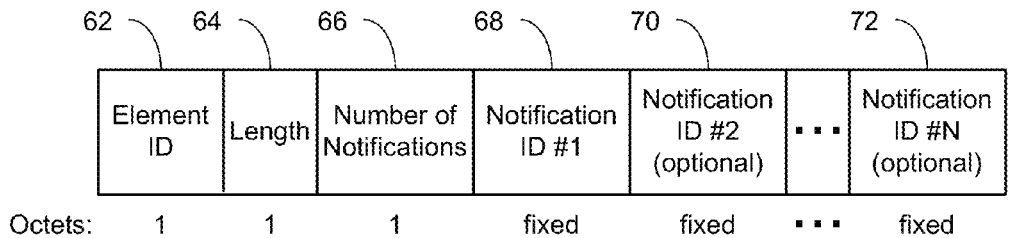
Figures 2, 4:
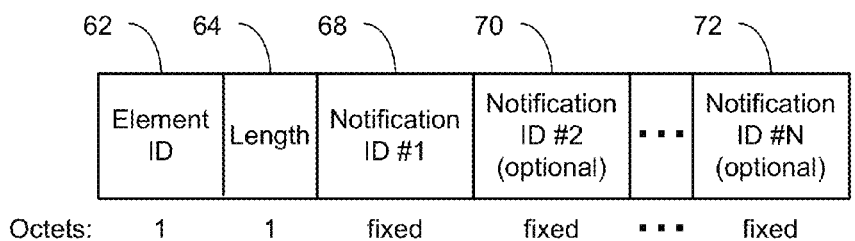
Figures 3, 4:
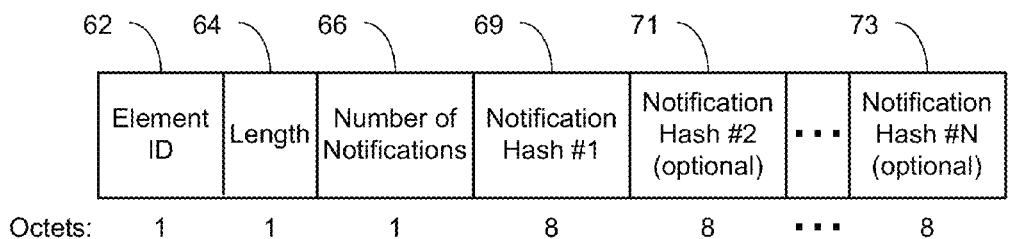
Figure 4:
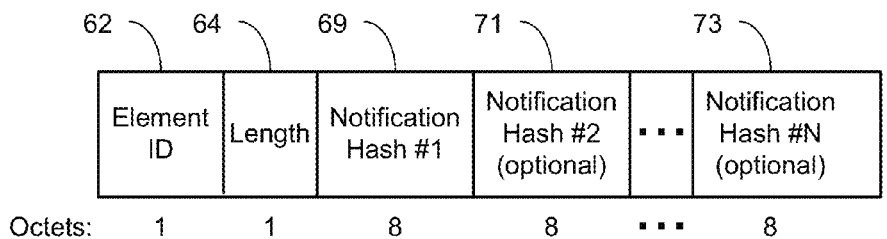

Briefly, FIG. 4-1 illustrates example formatting information for a notification IE. In order that the advertisement may be received by associated STAs and by non-associated STAs, it is contemplated that the size of the notification IE complies with any upper limit on the size of an IE in non-associated mode. An Element ID field 62 includes a value indicating that the IE is a notification IE, and a length field 64 stores the length of the notification IE. The length of the notification IE may vary, because information for multiple notifications may be included in the notification IE. A number field 66 includes a value indicating the number of notifications for which information is included in the notification IE. Notification ID #1 field 68 stores a first notification identifier to be advertised. Additional, optional, notification identifiers may be provided in fields 70 and 72. Fields 68, 70 and 72 are all of the same fixed size, for example, 2 octets, 4 octets, 8 octets, 16 octets, 32 octets, or 64 octets.

Example formatting information for a more compact notification IE is illustrated in FIG. 4-2. In view of the fixed size of fields 68, 70 and 72, the Number of Notifications in the notification IE can be calculated from the value of the Length field. The compact notification IE formatting information differs from that illustrated in FIG. 4-1 in that field 66 is omitted from the compact notification IE.

FIG. 4-3 illustrates example formatting information for a notification IE of the format shown in FIG. 4-1, in which the notification identifier is a value defined as HMAC-SHA1-64 ("MESSAGE", Notification_Message)

where Notification_Message denotes the contents of the notification message, and HMAC-SHA1-64 is the first 64 bits of the output produced by applying the HMAC-SHA1 keyed hash algorithm to a key, which is the string "MESSAGE", and Notification_Message. This is just an example Algorithms other than HMAC-SHA1-64 may be applied to the contents of the notification message, a different key other than the string "MESSAGE" may be used in a keyed hash algorithm, and a different number of bits may be used for the notification identifier.

Fields 62, 64, and 66 are as described with respect to FIG. 4-1. Notification Hash #1 field 69 stores a first notification hash to be advertised. Additional, optional, notification hashes may be provided in fields 71 and 73. Fields 69, 71, and 73 are all of the same fixed size, 8 octets.

FIG. 4-4 illustrates example formatting information for a compact notification IE of the format shown in FIG. 4-2, in which the notification identifier is a value defined as HMAC-SHA1-64 ("MESSAGE", Notification_Message)

where Notification_Message denotes the contents of the notification message, and HMAC-SHA1-64 is the first 64 bits of the output produced by applying the HMAC-SHA1 keyed hash algorithm to a key, which is the string "MESSAGE", and Notification_Message. This is just an example Algorithms other than HMAC-SHA1-64 may be applied to the contents of the notification message, a different key other than the string "MESSAGE" may be used in a keyed hash algorithm, and a different number of bits may be used for the notification identifier.

Fields 62 and 64 are as described with respect to FIG. 4-1. Notification Hash #1 field 69 stores a first notification hash to be advertised. Additional, optional, notification hashes may be provided in fields 71 and 73. Fields 69, 71, and 73 are all of the same fixed size, 8 octets.

It is contemplated that the mechanism described herein may be used for other purposes in addition to the advertisement and delivery of notifications. A type indicator may be included in the advertisement to specify which notification identifiers indeed refer to notifications as opposed to referring to information of another type.

For example, a type may be represented as an 8-bit value. A list of example type values is provided in the following table, where a value of 1 specifies a notification:

TABLE 1

Notification Types

| Name | Value |
| --- | --- |
| Emergency Alert System (EAS) | 0 |
| Notification | 1 |
| Reserved | 2-220 |
| Vendor Specific | 221 |
| Reserved | 222-255 |

In the example method illustrated in FIG. 3-2, the advertisement is in the form of a notification IE. The AP generates a notification IE at 46, where the notification IE includes notification identifiers of the active notifications in the AP's list of active notifications and includes for each of the notification identifiers an indication of its type. At 48, the AP includes the notification IE in downlink frames, for example, in beacon frames and in probe response frames. Presence of the notification IE in the downlink frame is an indication to STAs receiving the downlink frame that at least one notification message is available. Lack of presence of the notification IE in the downlink frame is an indication to STAs receiving the downlink frame that either the AP sending the downlink frame does not support the advertisement and delivery mechanism, or the AP sending the downlink frame supports the advertisement and delivery mechanism and there are no active notifications at this time for the AP to advertise. As part of the process of generating a beacon frame and as part of the process of generating a probe response frame, the AP may regenerate the notification IE to reflect the current state of the list of active notifications.

Figures 1, 5:
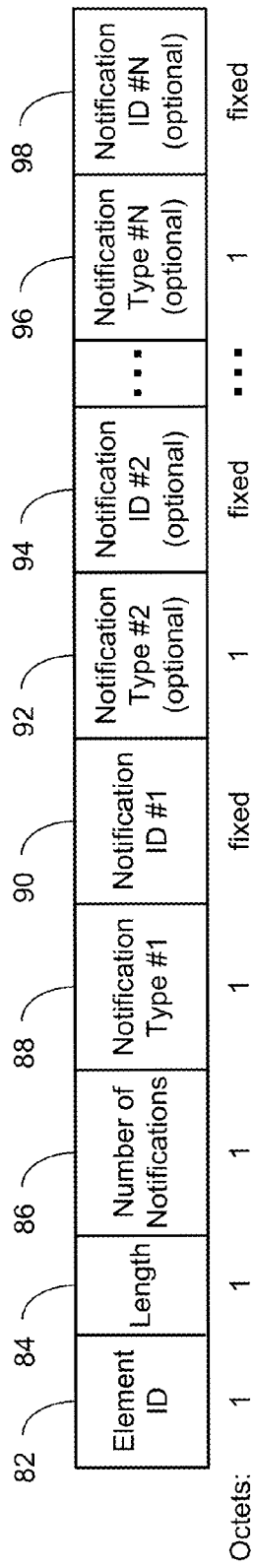
Figures 2, 5:
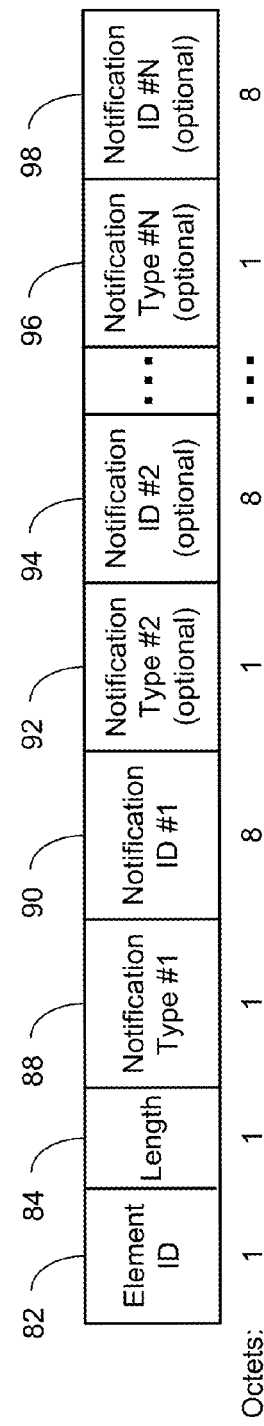

Briefly, FIG. 5-1 illustrates example formatting information for a notification IE 80. In order that the advertisement may be received by associated STAs and by non-associated STAs, it is contemplated that the size of the notification IE complies with any upper limit on the size of an IE in non-associated mode. Element ID field 82 includes a value indicating that the IE is a notification IE, and length field 84 stores the length of the notification IE. The length of the notification IE may vary, because information for multiple notifications may be included in the notification IE. Number field 86 includes a value indicating the number of notifications for which information is included in the notification IE. Notification Type #1 field 88 stores a type of a first notification to be advertised, and notification ID #1 field 90 stores a first notification identifier to be advertised. Additional, optional, types may be provided in fields 92 and 96. Additional, optional, notification identifiers may be provided in fields 94 and 98. Type fields 88, 92 and 96 are all of the same size, for example, 1 octet. Fields 90, 94, and 98 are all of the same fixed size, for example, 2 octets, 4 octets, 8 octets, 16 octets, 32 octets, or 64 octets.

Example formatting information for a more compact notification IE is illustrated in FIG. 5-2. In view of the fixed size of fields 90, 94 and 98, the Number of Notifications in the notification IE can be calculated from the value of the Length field. The compact notification IE formatting information differs from that illustrated in FIG. 5-1 in that field 86 is omitted from the compact notification IE.

FIG. 5-3 illustrates example formatting information for a notification IE of the format shown in FIG. 5-1, in which the notification identifier is a value defined as HMAC-SHA1-64 ("MESSAGE", Notification_Message).

This is just an example. Algorithms other than HMAC-SHA1-64 may be applied to the contents of the notification message, a different key other than the string "MESSAGE"

may be used in a keyed hash algorithm, and a different number of bits may be used for the notification identifier.

Fields 82, 84, 86, 88, 92, and 96 are as described with respect to FIG. 5-1. Notification Hash #1 field 89 stores a first notification hash to be advertised. Additional, optional, notification hashes may be provided in fields 93 and 97. Fields 89, 93, and 97 are all of the same fixed size, 8 octets.

FIG. 5-4 illustrates example formatting information for a compact notification IE of the format shown in FIG. 5-2, in which the notification identifier is a value defined as HMAC-SHA1-64 ("MESSAGE", Notification_Message) where Notification_Message denotes the contents of the notification message, and HMAC-SHA1-64 is the first 64 bits of the output produced by applying the HMAC-SHA1 keyed hash algorithm to a key, which is the string "MESSAGE", and Notification_Message. This is just an example Algorithms other than HMAC-SHA1-64 may be applied to the contents of the notification message, a different key other than the string "MESSAGE" may be used in a keyed hash algorithm, and a different number of bits may be used for the notification identifier.

Fields 82, 84, 88, 92, and 96 are as described with respect to FIG. 5-1. Notification Hash #1 field 89 stores a first notification hash to be advertised. Additional, optional, notification hashes may be provided in fields 93 and 97. Fields 89, 93, and 97 are all of the same fixed size, 8 octets.

In the example method illustrated in FIG. 3-3, the advertisement is effected through the SSID. The AP modifies the original SSID at 54 to incorporate the notification message. For example, the original SSID "myHome" could be modified with the notification message "breakin" to become "myHome-breakin".

It is also contemplated that the SSID incorporates the notification message on a permanent basis, and hence the SSID is not actually modified. An example of this is the SSID "Hospital-RF-Silence", where the notification message is "RF-Silence". In this example, the notification message comprises a control message "RF-Silence" which triggers the receiving STA to switch off its RF radio. Another example of this is the SSID "Central-Library", where the notification message is "Library". In this example, the notification message comprises a control message "Library" which triggers the receiving STA to mute its audio output and to set its alert function to a vibrating component of the STA.

The AP at 56 includes the modified SSID in certain downlink frames transmitted by the AP.

Upon receiving an indication that the notification message has expired, the AP reverts to the original SSID.

Handling of Advertisement including Notification Identifiers

An active notification that is advertised by an AP is not necessarily relevant for all or even any of the STAs that receive the advertisement. For example, a notification to turn off a cellular radio but not to turn off a WLAN radio is relevant only for a STA that also includes a cellular interface and is not relevant for a STA that does not include a cellular interface.

FIG. 6 is an illustration of an example method for handling an advertisement of availability of one or more active notifications. The example method may be performed by a STA, for example, by STA 18 or any of STAs 14. The example method is applicable in the case where the advertisement includes notification identifiers for the active notification, for example, where the advertisement is a notification IE in the format illustrated in FIG. 4 or FIG. 5.

At 102, the STA receives an advertisement of availability of one or more active notifications. The advertisement may be received in a downlink frame transmitted by the AP, for example, in a beacon frame or in a probe response frame.

At 104, the STA may initialize a counter J to the value 1 to track the notification identifiers included in the advertisement.

The notification identifier J may have been encrypted with an encryption key prior to its inclusion in the advertisement. In that case, the STA may perform at 106 a decryption process using a decryption key to attempt to decrypt the encrypted notification identifier J. The method continues if the decryption process is successful and the STA has obtained the unencrypted notification identifier J. For example, if a symmetric algorithm is used, the STA must use a decryption key that is identical to the encryption key. In another example, if an asymmetric algorithm is used, the STA must use a private decryption key that corresponds to the public encryption key used to encrypt the notification identifier.

If the notification identifier J included in the advertisement includes a digital signature, the STA may perform at 108 a verification process on the digital signature to determine whether to accept or reject the notification identifier's authenticity. Digital signing of the notification identifier may occur at the source of the notification message or may occur at the AP advertising the notification even in the case where the AP did not generate the notification message. The method continues if the result of the verification process is to accept the notification identifier's authenticity.

At 110, the STA may check whether notification identifier J was previously received by the STA. If so, the STA may determine not to proceed further with notification identifier J, thus avoiding handling the same instance of a notification more than once.

If notification identifier J was not previously received by the STA, the STA at 112 flags notification identifier J or otherwise records that notification identifier J is to be handled further.

At 114, the STA checks whether there are additional notification identifiers in the advertisement to consider. If so, then the STA increments the counter J by one and continues with the method from 106.

Once all notification identifiers included in the advertisement have been considered, the STA then checks at 118 whether any of the notification identifiers have been flagged or otherwise recorded for further handling. If there are no such notification identifiers, then the method ends, to be repeated again from the start upon receipt of the next advertisement.

At 120, the STA handles the notification identifiers that were flagged or otherwise recorded for future handling, by attempting to retrieve the one or more notification messages corresponding to the one or more flagged notification identifiers.

The manner in which the STA attempts to retrieve a notification message from the AP may depend on whether the STA is associated with the AP that advertised the availability of the one or more active notifications. If the STA is associated with the AP, the STA may invoke a notification application (that operates at a higher layer than the WLAN MAC sublayer of the STA) to retrieve the notification message from the AP. The notification application may provide one or more notification identifiers to the AP to specify which notification messages are to be retrieved.

Figure 7:
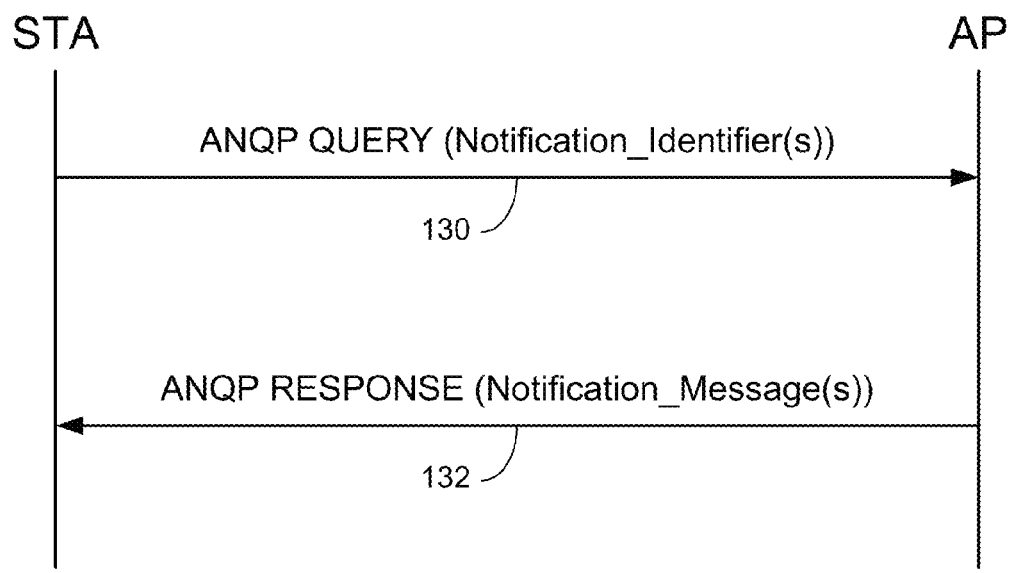
FIG. 7 is an illustration of an example Access Network Query Protocol (ANQP) flow sequence between a station (STA) and an AP.

If the STA is not associated with the AP, then the STA may use Access Network Query Protocol (ANQP) to retrieve the notification message. FIG. 7 is an illustration of an example ANQP flow sequence between a STA and an AP, for example, between STA 18 and AP 10. For example, the STA may generate an ANQP query 130 comprising one or more notification identifiers and may transmit ANQP query 130 in a manner receivable by the AP. The AP upon receipt and processing of ANQP query 130 may respond to the ANQP query. For example, the AP may generate an ANQP response 132 comprising the notification messages that correspond to the one or more notification identifiers and may transmit ANQP response 132 in a manner receivable by the STA. Although this explanation allows multiple notification messages to be retrieved using a single ANQP query-ANQP response pair, it is also contemplated that a separate ANQP query-ANQP response pair will be used for each notification message to be retrieved. The order in which the notification identifiers appeared in the advertisement may be used to indicate which notification message or messages are requested for retrieval. For example, if five notifications are active, the ANQP query may simply have the number 2 as an argument—instead of the second notification identifier—to indicate to the AP that the second of the five notification messages is requested for retrieval.

Figure 8:
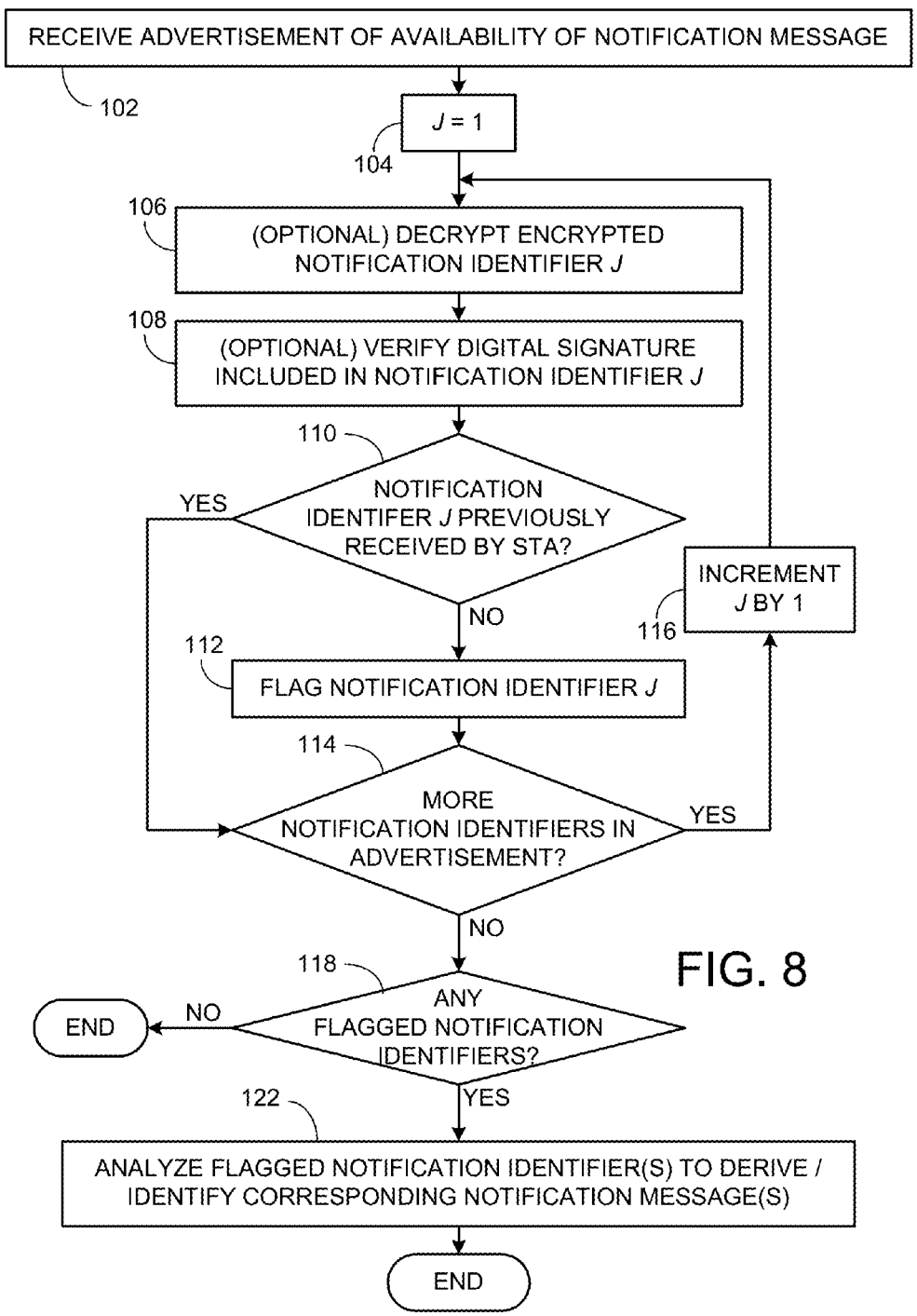
FIG. 8 is an illustration of another example method for handling an advertisement of availability of one or more active notifications.

FIG. 8 is an illustration of another example method for handling an advertisement of availability of one or more active notifications. The example method is to be performed by a STA, for example, by STA 18 or any of STAs 14. The example method is applicable in the case where the advertisement includes notification identifiers for the active notifications, for example, where the advertisement is a notification IE in the format illustrated in FIG. 4 or FIG. 5, and the notification message can be derived from an analysis of the notification identifier.

Those portions of the example method illustrated in FIG. 8 that are the same as those of the example method illustrated in FIG. 6 are denoted by the same reference numerals and will not be discussed further.

At 122, the STA handles the notification identifiers that were flagged or otherwise recorded for future handling, by analyzing the flagged notification identifiers to attempt to identify the notification message without retrieving it from the AP.

For example, if the notification message is sufficiently short, the notification identifier may consist of the notification message.

In another example, if the notification message is sufficiently short, the notification identifier may consist of the notification message concatenated with a message integrity code (MIC). For example, the MIC may be a hash of some WLAN network information such as the SSID or BSSID or both and a key. Inclusion of the WLAN network information in the MIC acts to cryptographically bind the identity of the originator of the notification to the notification itself. If the STA knows the hash algorithm, the WLAN network information and the key, then the STA can apply the hash algorithm to the WLAN network information and the key and compare the resulting output to the received hash to verify the integrity of the notification message.

In a further example, applicable when the notification messages form a set known to the STAs, if the notification identifiers are calculated by applying a hash algorithm to the notification message, and the STA knows the hash algorithm, then the STA can apply the hash algorithm to all of the notification messages in its set and compare the resulting hash outputs to the notification identifier to identify which notification message corresponds to the notification identifier.

In yet another example, applicable when the notification messages form a set known to the STAs, if the notification identifiers are calculated by applying a keyed hash algorithm to the notification message, and the STA knows the keyed hash algorithm and the key, then the STA can apply the keyed hash algorithm to all of the notification messages in its set and compare the outputs to the notification identifier to identify which notification message corresponds to the notification identifier.

A combination of the example methods illustrated in FIG. 6 and FIG. 8 is contemplated, in which the STA first attempts to derive or identify the notification message from the flagged notification identifier (as at 122 of FIG. 8) and if that attempt fails, then the STA retrieves the notification message corresponding to the flagged notification identifier from the AP (as at 120 of FIG. 6).

Handling of Advertisement by SSID

Figure 9:
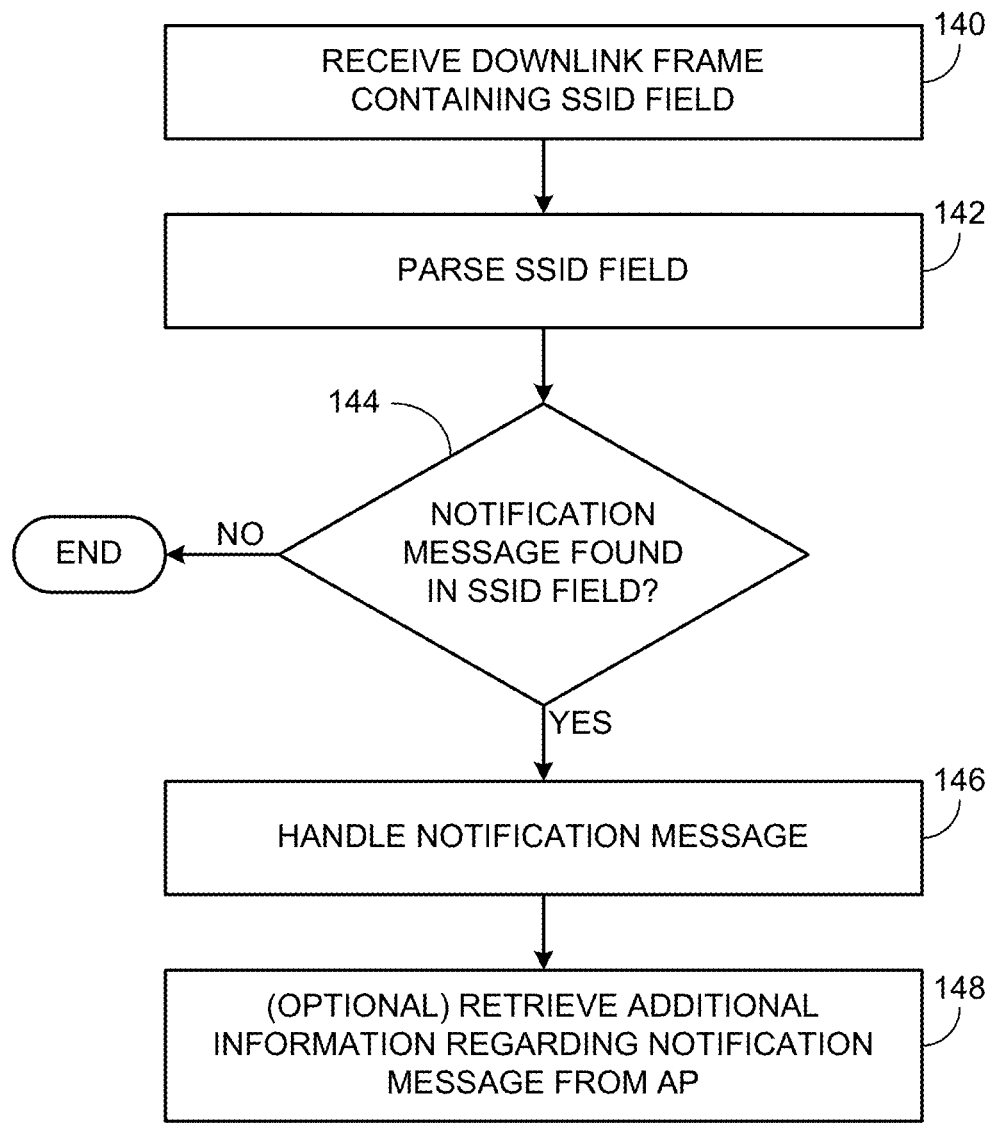
FIG. 9 is an illustration of an example method for handling an advertisement effected through the SSID.

FIG. 9 is an illustration of an example method for handling an advertisement effected through the SSID. The example method is to be performed by a STA, for example, by STA 18 or any of STAs 14.

At 140, the STA receives from the AP a downlink frame containing an SSID field.

At 142, the STA parses the contents of the downlink frame's SSID field. The parsing may comprise looking for known notification messages, for example "RF-Silence" in the contents. The parsing may comprise comparing the contents of the downlink frame's SSID field to the contents of the SSID fields of WLAN connection profiles stored in the STA, and identifying the notification message as the part of the contents of the downlink frame's SSID field that is not in the WLAN connection profile's SSID field. For example, if the SSID "myHome" is modified to "myHome-breakin" prior to sending the downlink frame, and the WLAN connection profile's SSID field stores "myHome", the parsing will identify the notification message as "-breakin".

If no notification message is found in the contents of the downlink frame's SSID field, as checked by the STA at 144, the method ends, to be repeated upon receipt of the next downlink frame having an SSID field.

If a notification message is found in the contents of the downlink frame's SSID field, as checked by the STA at 144, the STA proceeds to handle the notification message at 146. If the notification message comprises a control message, handling the notification message may involve acting on the control message.

Figure 10:
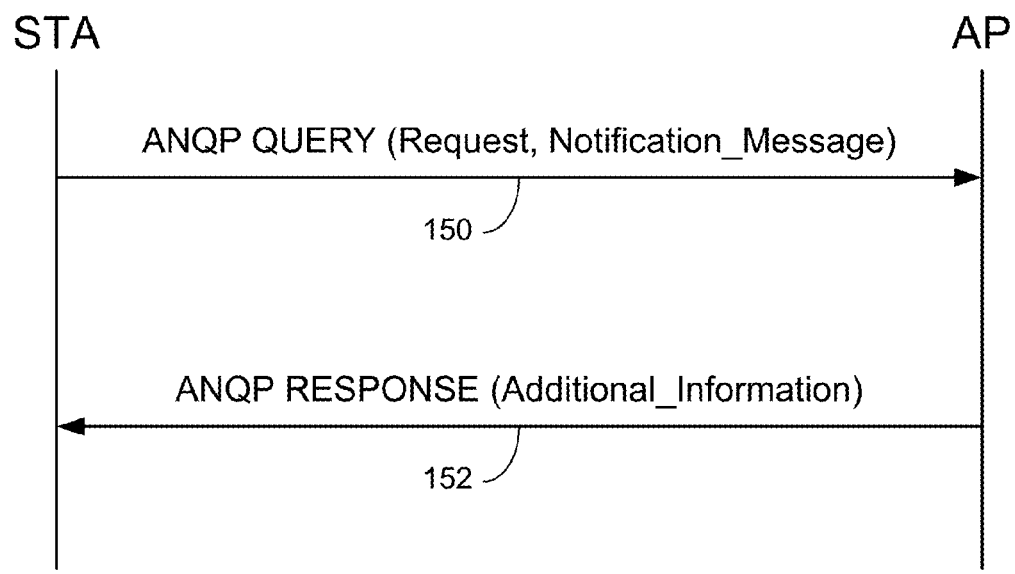
FIG. 10 is an illustration of another example ANQP flow sequence between a STA and an AP.

Optionally, the STA may retrieve additional information regarding the notification message from the AP. For example, the STA may use ANQP to retrieve the additional information. FIG. 10 is an illustration of an example ANQP flow sequence between a STA and an AP, for example, between STA 18 and AP 10. For example, the STA may generate an ANQP query 150 comprising a request for additional information and the notification message, and may transmit ANQP query 150 in a manner receivable by the AP. The AP upon receipt and processing of ANQP query 150 may respond to the ANQP query. For example, the AP may generate an ANQP response 152 comprising the requested additional information and may transmit ANQP response 152 in a manner receivable by the STA.

Control Messages

Any generic notification message may be advertised and delivered using the mechanisms described in this document. However, if the contents of the notification message comprise a control message, the STA may act on the control message.

Figures 1, 11:
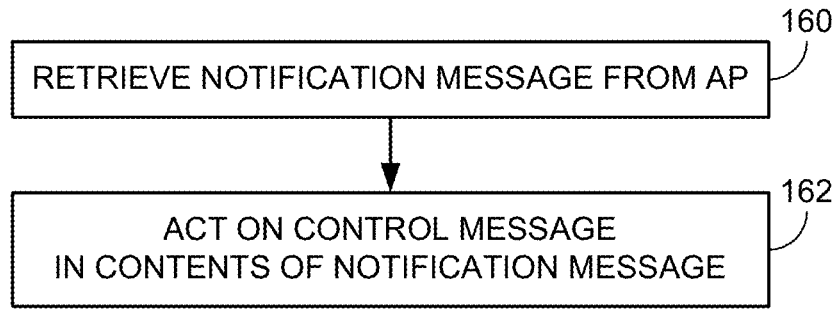
Figures 2, 11:
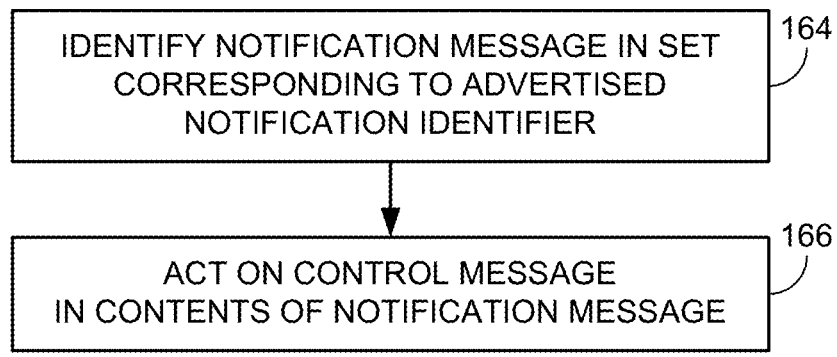

This is discussed generally with respect to FIGS. 11-1 and 11-2 and in more detail with respect to example use cases.

FIG. 11-1 is an illustration of an example method for handling a notification message, to be performed by a STA, for example, by STA 18 or any one of STAs 14. At 150, the STA retrieves a notification message from the AP that advertised the availability of the notification. At 152, the STA acts upon a control message included in the contents of the retrieved notification message. The control message influences the behavior of the STA. For example, the STA is triggered to enable or disable certain behavior.

FIG. 11-2 is an illustration of an example method for handling a notification message, to be performed by a STA, for example, by STA 18 or any one of STAs 14. The example method is applicable in the case where the notification messages are from a set of notification messages that is known to the STA. At 154, the STA identifies which notification message in the set corresponds to an advertised notification identifier, as at 122 of FIG. 8. At 156, the STA acts upon a control message included in the contents of the identified notification message. The control message influences the behavior of the STA. For example, the STA is triggered to enable or disable certain behavior.

Block Diagrams

Figure 12:
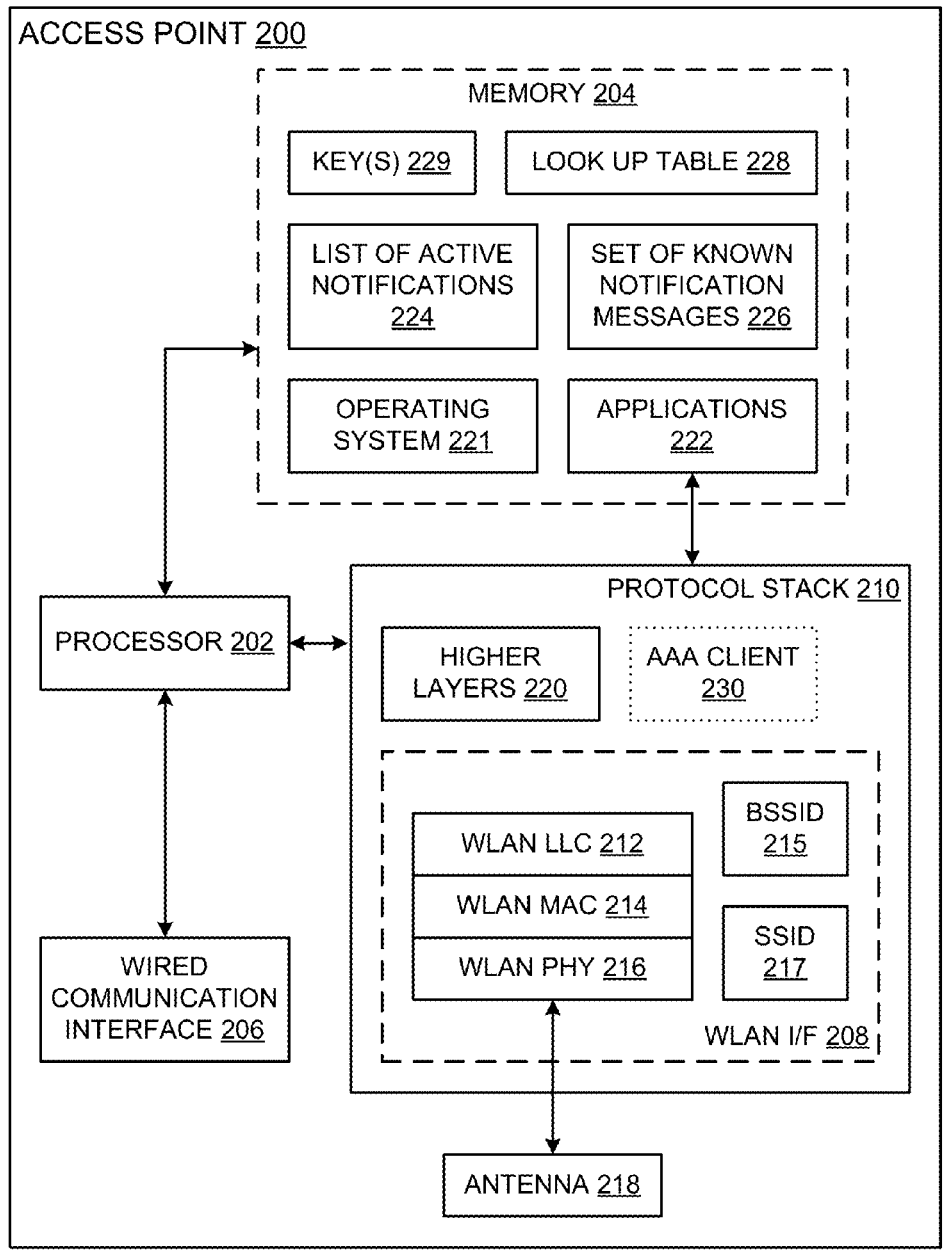
FIG. 12 is a block diagram of an example AP.

FIG. 12 is a block diagram of an example AP, for example AP 10. An AP 200 comprises a processor 202 coupled to a memory 204 and to a wired communication interface 206. AP 200 also comprises a WLAN interface 208 within a protocol stack 210 that is coupled to processor 202. WLAN interface 208 comprises a WLAN Logical Link Control (LLC) module 212, a WLAN MAC module 214 and a WLAN PHY module 216. The BSSID of AP 200 is stored in WLAN interface 208, possibly in a register 215. The SSID of the WLAN supported by AP 200 is stored in WLAN interface 208, possibly in a register 217. WLAN MAC module 214 may be compatible with IEEE 802.11. AP 200 also comprises an antenna 218 coupled to WLAN PHY module 216. Protocol stack 210 may comprise higher layers 220.

Memory 204 may store an operating system 221 to be executed by processor 202. Memory 204 may store applications 222 installed in AP 200 to be executed by processor 202. Examples of applications 222 include a notification generation application as described above, a notification identifier generation application as described above, and a configuration application that enables a WLAN administrator to configure parameters of the WLAN, for example, its SSID and BSSID(s). Memory 204 may also store a list 224 of active notifications. The term "list" is used to aid the explanation, and it is contemplated that data structures other than a list may be used by AP 200 to monitor which notifications are active and hence are to be advertised.

Memory 204 may store a set 226 of notification messages that are known to some or all STAs. As explained with respect to FIG. 2-3, AP 200 may store previously calculated or generated or received notification identifiers. To that end, memory 204 may have a look up table (LUT) 228 in with the previously calculated or generated or received notification identifiers are stored.

Memory 204 may store one or more cryptographic keys 229. For example, a cryptographic key may be used by AP 200 to encrypt a notification identifier. In another example, a cryptographic key may be used by AP 200 to digitally sign a notification identifier. In a further example, a cryptographic key may be used by AP 200 as the key of a keyed hash algorithm. In yet another example, a cryptographic key may be used by AP 200 in the calculation of a MIC as described above with respect to FIG. 8.

Where AP 200 is compatible with the EAP framework, protocol stack 210 may comprise an Authorization, Authentication and Accounting (AAA) client 230 that enables AP 200 to communicate using AAA protocol with an AAA server and acts as an IEEE 802.1X Authenticator to a STA that is compatible with the EAP framework.

Generation of a notification IE, and inclusion of a notification IE in a downlink frame such as a beacon frame or a probe response frame may be implemented in WLAN MAC module 214. Inclusion of a modified SSID in a downlink frame may be implemented in WLAN MAC module 214. ANQP support may be implemented in WLAN MAC module 214.

AP 200 may comprise other elements that, for clarity, are not illustrated in FIG. 12. Similarly, AP 200 may comprise a subset of the elements illustrated in FIG. 12.

Figure 13:
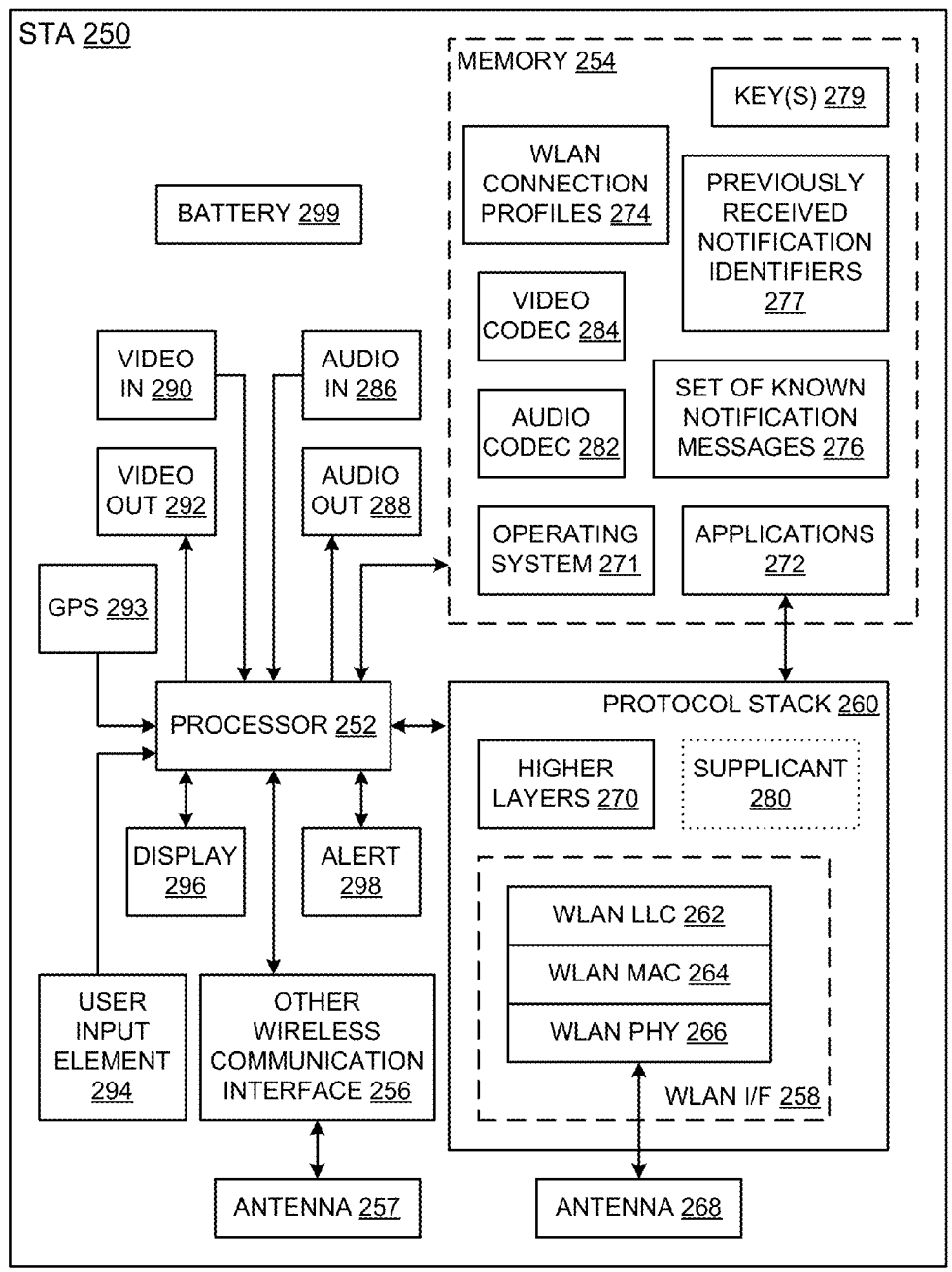
FIG. 13 is a block diagram of an example STA.

FIG. 13 is a block diagram of an example STA, for example STA 18 or any one of STAs 14. An STA 250 comprises a processor 252 coupled to a memory 254 and optionally to one or more other wireless communication interfaces 256. For example, wireless communication interfaces 256 may comprise a short-range wireless communication interface such as a wireless personal area network interface, possibly compatible with Bluetooth®. In another example, wireless communication interfaces 256 may comprise a wireless wide area network (WWAN) interface such as for cellular communications. One or more antennas 257 may be coupled to respective ones of the wireless communication interfaces 256. An antenna may be shared among more than one wireless interface.

STA 250 also comprises a WLAN interface 258 within a protocol stack 260 that is coupled to processor 252. WLAN interface 258 comprises a WLAN LLC module 262, a WLAN MAC module 264 and a WLAN PHY module 266. WLAN MAC module 264 may be compatible with IEEE 802.11. STA 250 also comprises an antenna 268 coupled to WLAN PHY module 266. Protocol stack 260 may comprise higher layers 270.

Memory 254 may store an operating system 271 to be executed by processor 252. Memory 254 may store applications 272 installed in STA 250 to be executed by processor 252. For example, applications 272 may comprise a notification application as described above to retrieve notification messages from the AP when STA 250 is associated with the AP. In another example, applications 272 may comprise a control application to act on notification messages. In a further example, applications 272 may comprise a Voice over Internet Protocol (VoIP) application. In yet another example, applications 272 may comprise a telephony application. Memory 254 may also store data (not shown) used by operating system 271 and applications 272.

Memory 254 may store one or more WLAN connection profiles 274, each identifying a wireless local area network by its network name.

Memory 254 may store a set 276 of notification messages that are known to some or all STAs. Memory 254 may store previously received notification identifiers 277 for the purpose of comparison with newly received notification identifiers.

Memory 254 may store one or more cryptographic keys 279. For example, a cryptographic key may be used by STA

250 to decrypt an encrypted notification identifier. In another example, a cryptographic key may be used by STA 250 to verify a digital signature of a notification identifier. In a further example, a cryptographic key may be used by STA 250 as the key of a keyed hash algorithm. In yet another example, a cryptographic key may be used by STA 250 in the calculation of a MIC as described above with respect to FIG. 8.

Where STA 250 is compatible with the EAP framework, protocol stack 260 may comprise a Supplicant module 280 that acts as an IEEE 802.1X endpoint.

Memory 254 may store an audio coder-decoder (codec) 282 or a video codec 284 or both. STA 250 may comprise an audio input element 286 and an audio output element 288, both coupled to processor 252. STA 250 may comprise a video input element 290 and a video output element 292, both coupled to processor 252.

STA 250 may comprise a Global Positioning System (GPS) module 293 coupled to processor 252.

STA 250 may comprise one or more user input elements 294 coupled to processor 252. Examples of user input elements include a keyboard, a keypad, a touchscreen, a joystick, a thumbwheel, a roller, a touchpad, and the like.

STA 250 may comprise one or more user output elements coupled to processor 252, of which a display 296 is illustrated. In the event that display 296 is a touchscreen, it functions also as a user input element.

STA 250 may comprise one or more alert components 298 coupled to processor 252, to be activated in order to alert a user, for example, by sounding a buzzer, playing a ringtone, or vibrating.

Receipt of a downlink frame and handling of an advertisement in a downlink frame may be implemented in WLAN MAC module 264. ANQP support may be implemented in WLAN MAC module 264.

STA 250 comprises a battery 299 that provides power to the other components of STA 250.

STA 250 may comprise other elements that, for clarity, are not illustrated in FIG. 13. Similarly, STA 250 may comprise a subset of the elements illustrated in FIG. 13.

Notification Identifiers

As explained above, each active notification may be represented in the advertisement by a notification identifier. A notification identifier is a value used to indicate an instance of a notification message.

In one example, the value may be defined as a timestamp. The timestamp may refer to the time at which the notification message was generated, or the time at which the notification message was transmitted to the AP, or the time at which the notification message was received at the AP, or the time at which activation of the notification message occurred, or the time at which the notification identifier was generated.

In another example, the value may be defined as a number used once (nonce), which is a value that is unlikely to recur.

A timestamp notification identifier cannot be analyzed by the STA to determine which of a set of notification messages known to the STA corresponds to the notification identifier. Likewise, a nonce notification identifier cannot be analyzed by the STA to determine which of a set of notification messages known to the STA corresponds to the notification identifier.

In yet another example, the notification identifier is identical to the notification message.

In a further example, the notification identifier consists of the notification message concatenated with a message integrity code (MIC). For example, the MIC may be a hash of some WLAN network information such as the SSID or BSSID or both and a key.

In another example, the value is calculated by applying a hash algorithm to the notification message. For example, the value may be defined as SHA1-64 (Notification_Message)

where Notification_Message denotes the contents of the notification message, and SHA1-64 is the first 64 bits of the hash produced by applying the SHA1 hash algorithm to the argument, which is Notification_Message. Use of other hash algorithms, for example, MD5, are also contemplated. The use of SHA1-64 results in a 64-bit value. Values of other lengths, for example, 32 bits, 128 bits, 256 bits and 512 bits, are also contemplated.

The value may involve concatenation of the SSID or the BSSID or both with the contents of the notification message. For example, the value may be defined as any of the following:

SHA1-64 (SSID||Notification_Message)
SHA1-64 (BSSID||Notification_Message)
SHA1-64 (SSID||BSSID||Notification_Message)

where || denotes concatenation. Inclusion of the SSID or BSSID or both in the notification identifier helps bolster a STA's confidence that a received notification identifier was indeed received from the AP that appears to have sent it.

In a further example, the value is calculated by applying a keyed hash algorithm to the notification message. For example, the value may be defined as HMAC-SHA1-64 ("MESSAGE", Notification_Message)

where Notification_Message denotes the contents of the notification message, and HMAC-SHA1-64 is the first 64 bits of the output produced by applying the HMAC-SHA1 keyed hash algorithm to a key, which is the string "MESSAGE", and Notification_Message. Other keyed hash algorithms, for example, HMAC-MD5-64, may be used instead of HMAC-SHA1-64. A different key other than the string "MESSAGE" may be used in a keyed hash algorithm. A different number of bits may be used for the notification identifier. For example, HMAC-SHA1-128 results in a 128-bit value and could be used instead of HMAC-SHA1-64.

The value may involve concatenation of the SSID or the BSSID or both with the contents of the notification message. For example, the value may be defined as any of the following:

HMAC-SHA1-64 ("MESSAGE", SSID||Notification_Message)
HMAC-SHA1-64 ("MESSAGE", BSSID||Notification_Message)
HMAC-SHA1-64 ("MESSAGE", SSID||BSSID||Notification_Message)

where || denotes concatenation. Inclusion of the SSID or BSSID or both in the notification identifier helps bolster a STA's confidence that a received notification identifier was indeed received from the AP that appears to have sent it.

Example Use Cases—Control Messages

The content of a notification message may be merely informative or may comprise a control message that triggers the STA to modify its behavior. In the latter case, by providing the control message to the STA, the STA can enable or disable certain behavior.

Consider, for example, an AP that is located in a gym. The content of a notification message may comprise a control message that triggers the STA to start its music player application and to play specific music files accessible by the STA.

Consider, for example, an AP that is located in a hospital or an airplane. The content of a notification message may comprise a control message that triggers the STA to disable its radio frequency (RF) interface so that RF communications do not take place within range of the AP.

Consider, for example, an AP that is configured to prohibit the establishment of any peer-to-peer networks (e.g. Wi-Fi Direct™ networks) within its range. The content of a notification message may be a control message that triggers the STA to disable its peer-to-peer capability.

Consider, for example, an AP that is configured to allow Internet access within a public hotspot. The content of a notification message may be a control message that triggers the STA to inform the user that the network access fee, through that public hotspot, is required to be renewed.

Consider, for example, an AP that is located in a library or a church or a border control facility. The content of a notification message may comprise a control message that triggers the STA to mute its audio output, to disable its Voice over Internet Protocol (VoIP) applications, and to set its alert function to a vibrating component.

Consider, for example, an AP that is located in a vehicle. In that case, the AP does not have a wired communication interface, but rather a different wireless communication interface, for example, satellite or Worldwide Interoperability for Microwave Access (WiMAX). The content of a notification message may comprise a control message that triggers the STA to activate its wireless personal area network (WPAN) interface for potential hands-free conversation. The content of a notification message may comprise a control message that triggers the STA to activate its GPS application for vehicle navigation purposes.

Consider, for example, an AP that is part of an enterprise WLAN deployment. The content of a notification message may comprise a control message that triggers the STA to run a telephony application to switch and support telephone calls over the enterprise WLAN rather than through a wireless wide area network (WWAN) connection, for example, a cellular network.

To continue the enterprise WLAN deployment example, an enterprise information technology (IT) administrator may want to implement a particular policy in STAs when the STAs associate with the enterprise WLAN. For example, the content of a notification message may comprise a control message that triggers the STA to modify, disable or enable certain capabilities. For example, the control message may trigger the STA to switch off the cellular radio and force voice traffic to be routed over the WLAN radio enterprise network. In another example, the control message may trigger the STA to force any WLAN Internet connections to switch over and use the enterprise fire-walled network. In a further example, the control message may trigger the STA to curtail any gaming sessions or music playing or both. In yet another example, the control message may enable enterprise printer and voice-message-box access from the STA. In another example, the control message may trigger the STA to disable messaging in a conference room during a meeting. In a further example, the control message may trigger the STA to disable Internet browsing during work hours.

In another example, some STAs are "white-space devices" capable of using frequencies, on a secondary basis, that are allocated to primary services (for example, television broadcasting) but are not used locally, or frequencies that were previously allocated to primary services but have since been abandoned. The Federal Communications Commission (FCC) has permitted unlicensed white-space devices to use those frequencies, referred to as "White space", on a secondary basis, if they can guarantee that they will not interfere with the assigned primary service. An information element conveyed to a STA could comprise an indication that a white-space database update is available for download within the local WLAN.

Extensible Authentication Protocol (EAP) Implementation

Extensible Authentication Protocol is an authentication framework frequently used in wireless networks and Point-to-Point connections. EAP provides some common functions and negotiation of authentication methods, called EAP methods. There are currently about 40 different methods defined.

Different authentication systems use the EAP framework to define tunnel authentication methods for establishing strong mutual authentication through the use of different authentication schemes, including smart cards, One Time Passwords, clear text passwords, and others. Tunnel EAP methods carry EAP methods and other authorization information such as channel binding that need an inner tunnel transport mechanism.

To allow for interoperability, a container format defined by the EAP Type-Length-Value (TLV) data structure can be used to carry arbitrary data between two EAP peers. It is intended that this container be used only inside a protected EAP tunnel. Existing tunnel EAP methods already use TLV structures to carry data.

The EAP TLV data structure is described in IETF I-D, "EAP Type-Length-Value Container", http://www.ietforg/id/draft-cam-winget-eap-tlv-00.txt, published January 2010.

A notification frame is transported within a secure tunnel using an EAP method. As explained in further detail below, the notification frame may be sent as part of an EAP exchange response, or in response to a request for the notification frame. Since many devices use EAP to perform authentication, this implementation provides a secure way to transport the notification message and is feasible even for devices that do not use IEEE 802.11 technology.

If multiple notifications are active in the network, a list of them can also be provided.

Figure 14:
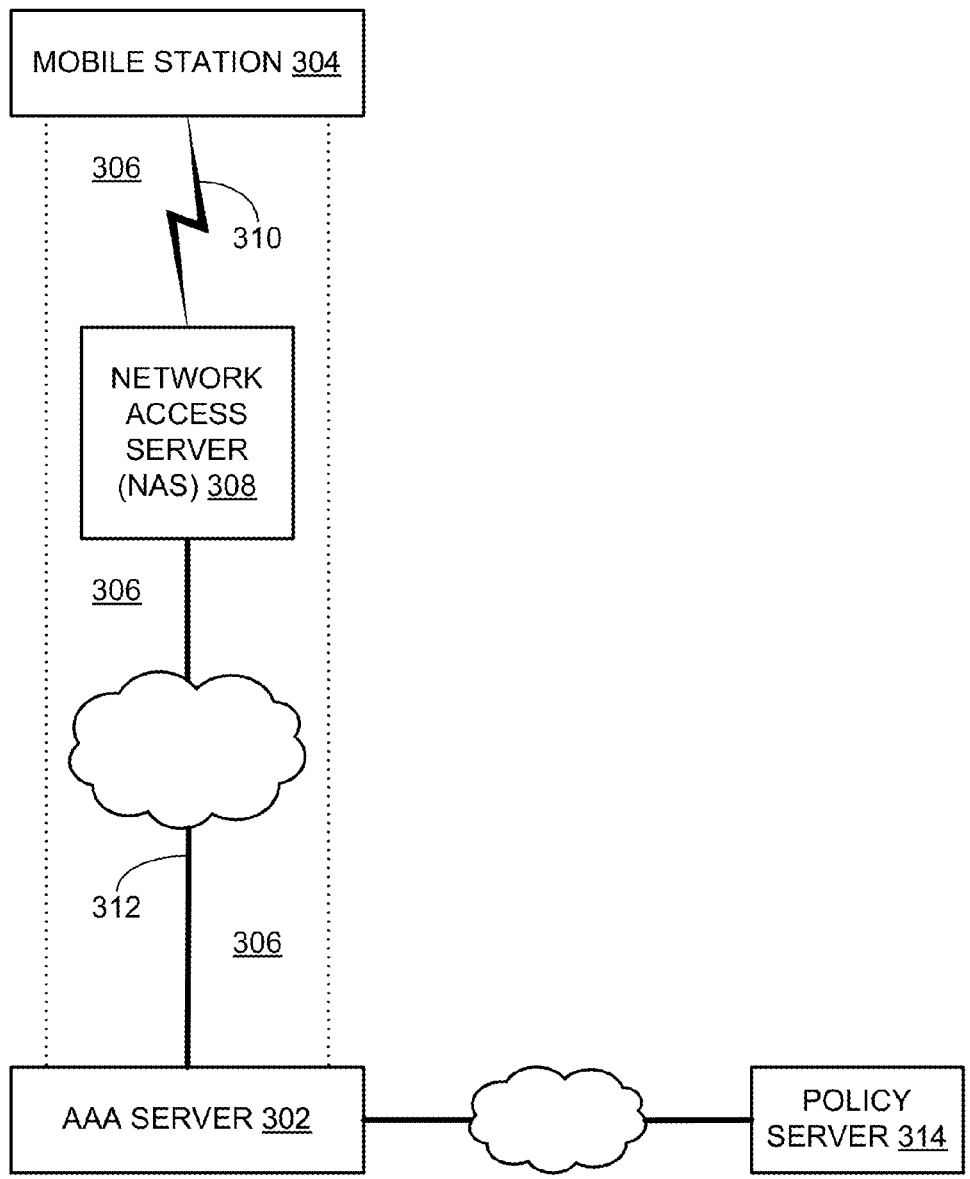
FIG. 14 is an illustration of an example network architecture for notification advertisement and delivery within an Extensible Authentication Protocol (EAP) framework.

FIG. 14 is an illustration of an example network architecture for notification advertisement and delivery within an EAP framework. An Authorization, Authentication and Accounting (AAA) server 302 and a mobile station 304, both acting as EAP peers, form a secure tunnel 306 therebetween. Secure tunnel 306 traverses a Network Access Server (NAS) 308. NAS 308 communicates with mobile station 304 over a wireless link 310 using the IEEE 802.1X transport mechanism. NAS 308 is coupled with AAA server 302 via wired infrastructure (which may comprise non-wired segments and may include one or more networks), and communicates with AAA server 302 using AAA protocols, for example, RADIUS or DIAMETER. A policy server 314 is coupled to AAA server 302, possibly via one or more networks.

Notifications may be centrally managed using policy server 314, with policy server 314 updating AAA server 302 with an active notification. Modifications to the description that follows to enable AAA server 302 to generate its own notifications are obvious to one of ordinary skill in the art.

Figure 15:
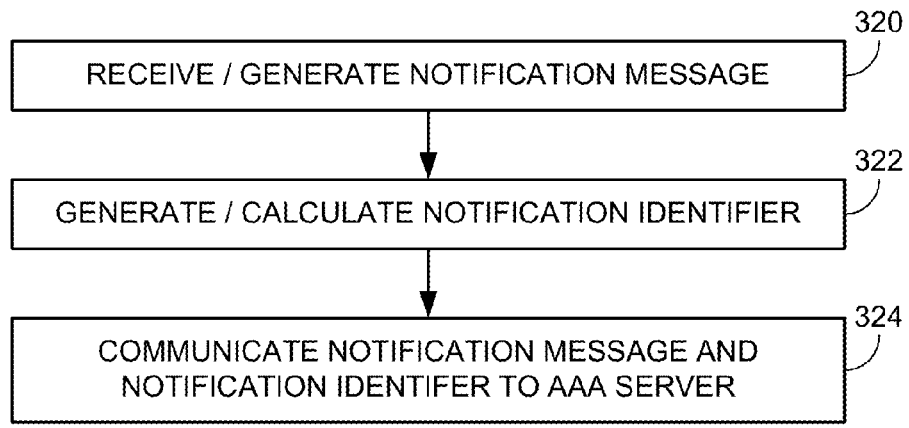
FIG. 15 is an illustration of an example method resulting in the communication of a notification to an Authorization, Authentication and Accounting (AAA) server.

FIG. 15 is an illustration of an example method resulting in the communication of a notification to an AAA server, for example, to AAA server 302. The example method may be performed by a policy server, for example, by policy server 314. The policy server may receive at 320 a notification message from an external source (not shown in FIG. 14). Alternatively, the policy server may generate internally at 320 a notification message. Internal generation of a notification message may involve configuration of the policy server by a policy administrator, possibly through a notification generation application at the policy server. At 322, the policy server calculates or otherwise generates a notification identifier for the notification message received or generated at 320, possibly through a notification identifier generation application at the policy server. At 324, the policy server communicates the notification message and its notification identifier to an AAA server.

Figures 1, 16:
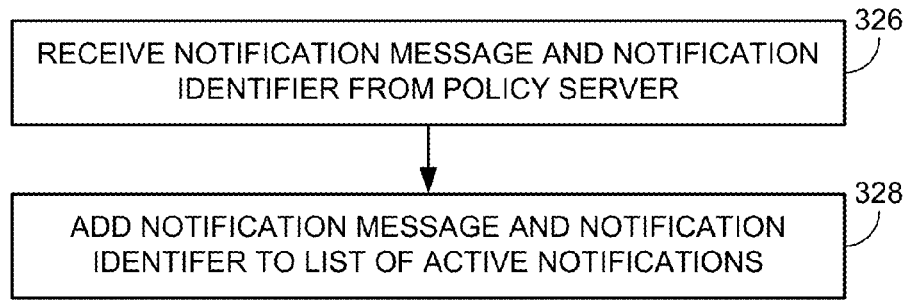
Figures 2, 16:
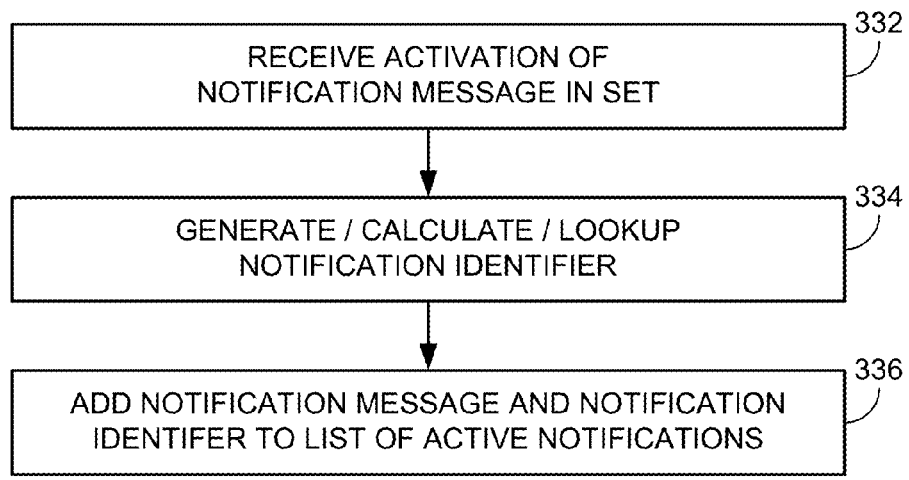

FIGS. 16-1 and 16-2 are illustrations of example methods resulting in the addition of a notification to a list of active notifications in an AAA server. The phrase "active notification" is used to refer to a notification the availability of which is to be advertised. A notification that was previously active and is not longer to be advertised is deemed an "expired notification". It is contemplated that some notifications are permanently active and never expire. The term "list" is used to aid the explanation, and it is contemplated that data structures other than a list may be used by the AAA server to monitor which notifications are active and hence are to be advertised. Moreover, if only a single notification is active, the data structure may not be in the form of a list.

As illustrated in FIG. 16-1, an AAA server may receive at 326 a notification message and its notification identifier from a policy server. At 328, the AAA server adds the received notification and its notification identifier to the policy server's list of active notifications. The policy server may use its own cryptographic information to encrypt the notification identifier or to digitally sign the notification identifier or both. The policy server may use its own cryptographic information in the generation or calculation of the notification identifier.

The example method illustrated in FIG. 16-2 applies to a situation where a notification message is from a set of notification messages that are known to the mobile station, to the AAA server, and to the policy server. In that situation, the AAA server may receive at 332 an activation from the policy server of a particular notification message in the set. At 334, the AAA server calculates or otherwise generates a notification identifier for the notification message activated at 332. Alternatively, the AAA server may have previously calculated or generated or received notification identifiers for the notification messages in the set, and at 334 may simply look up the notification identifier corresponding to the notification message activated at 332. At 336, the AAA server adds the notification message and its notification identifier to the AAA server's list of active notifications. Where the AAA server calculates or otherwise generates the notification identifier, the AAA server may use its own cryptographic information to encrypt the notification identifier or to digitally sign the notification identifier or both, and the AAA server may use its own cryptographic information in the generation or calculation of the notification identifier, as in the example described herein of a MIC in the notification identifier.

Figures 1, 17:
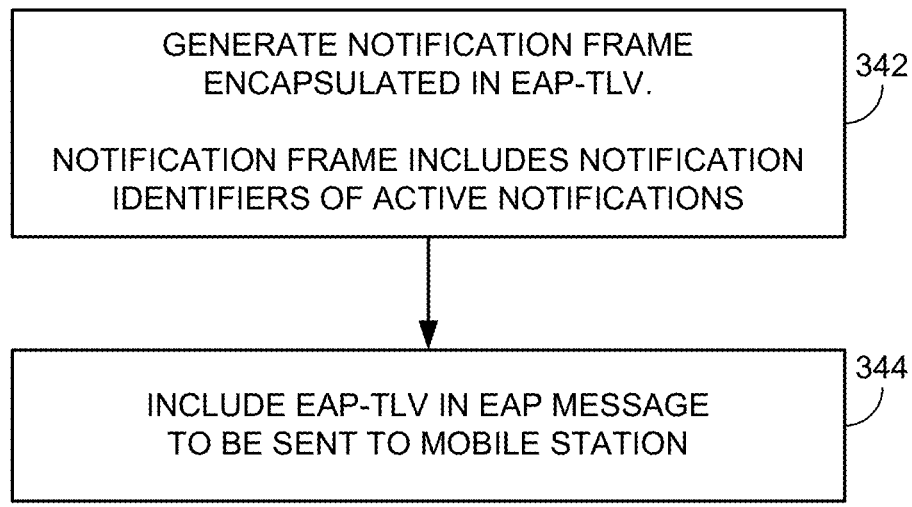
Figures 2, 17:
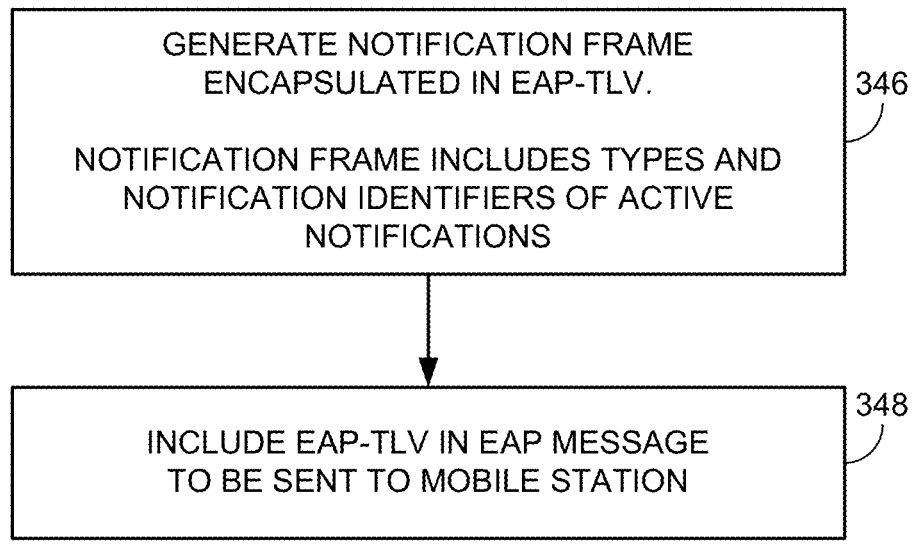

FIGS. 17-1 and 17-2 are illustrations of example methods for advertisement of availability of one or more active notifications. The example methods are to be performed by an AAA server, for example, by AAA server 302. In both example methods, the advertisement is in the form of a notification frame encapsulated in an EAP-TLV.

In the example method illustrated in FIG. 17-1, the AAA server generates a notification frame encapsulated in an EAP-TLV at 342, where the notification frame includes notification identifiers of the active notifications in the AAA server's list of active notifications. Many different examples of notification identifiers are described above. At 344, the AAA server includes the EAP-TLV in an EAP message to be sent to the mobile station.

An example format of the notification frame encapsulated within an EAP-TLV follows:

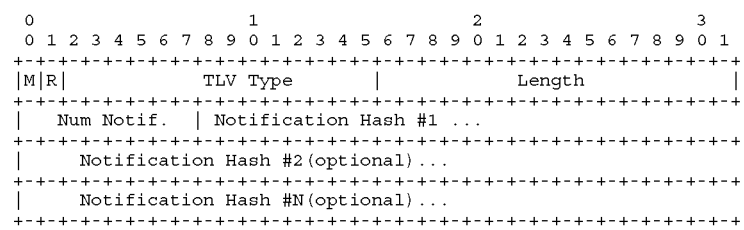

where M has the value 0 for an optional TLV and the value 1 for a mandatory TLV, R is reserved and has the value 0, TLV Type is a 14-bit field denoting the notification TLV type, Length is the length of all the Notification Hash fields in octets, Num Notif. is the number of notifications in the list, limited to 31, and the Notification Hash is an optional 8-octet field. Other sizes for Notification Hash are contemplated.

It is contemplated that the mechanism described herein may be used for other purposes in addition to the advertisement and delivery of notifications. A type indicator may be included in the advertisement to specify which notification identifiers indeed refer to notifications as opposed to referring to information of another type.

In the example method illustrated in FIG. 17-2, the AAA server generates a notification frame encapsulated in an EAP-TLV at 346, where the notification frame includes notification identifiers of the active notifications in the AAA server's list of active notifications and includes for each of the notification identifiers an indication of its type. Many different examples of notification identifiers are described above. At 348, the AAA server includes the EAP-TLV in an EAP message to be sent to the mobile station.

Another example format of the notification frame encapsulated within an EAP-TLV follows:

```
                          Notification Frame TLV format 0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|M|R|            TLV Type           |            Length             |
+-+-+-+-+-+-+-+-+-+-+-+-+-+-+-+-+-+-+-+-+-+-+-+-+-+-+-+-+-+-+-+-+
|   Num Notif.  |  Notif. Type  |   Notification Hash #1(optional)...
+-+-+-+-+-+-+-+-+-+-+-+-+-+-+-+-+-+-+-+-+-+-+-+-+-+-+-+-+-+-+-+-+
| Notif. Type2  |       Notification Hash #2(optional)...
+-+-+-+-+-+-+-+-+-+-+-+-+-+-+-+-+-+-+-+-+-+-+-+-+-+-+-+-+-+-+-+-+
| Notif. TypeN  |       Notification Hash #N(optional)...
+-+-+-+-+-+-+-+-+-+-+-+-+-+-+-+-+-+-+-+-+-+-+-+-+-+-+-+-+-+-+-+-+
``` where M has the value 0 for an optional TLV and the value 1 for a mandatory TLV, R is reserved and has the value 0, TLV Type is a 14-bit field denoting the notification TLV type, Length is the length of all the Notification Type and Notification Hash fields in octets, Num Notif. is the number of notifications in the list, limited to 27, Notif Type is a 1-octet field whose value is as provided in Table 1 above, and the Notification Hash is an optional 8-octet field. Other sizes for Notification Hash are contemplated.

Figures 1, 18:
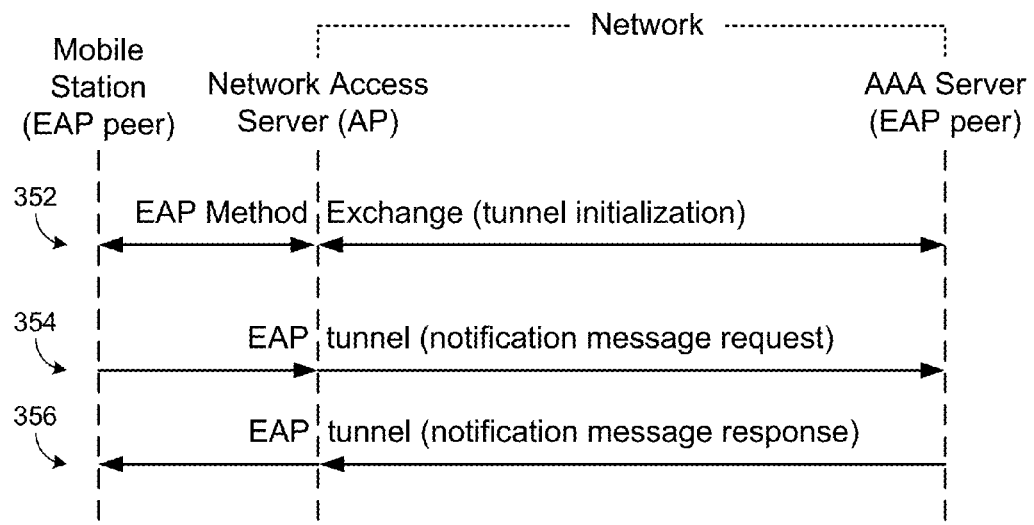
Figures 2, 18:
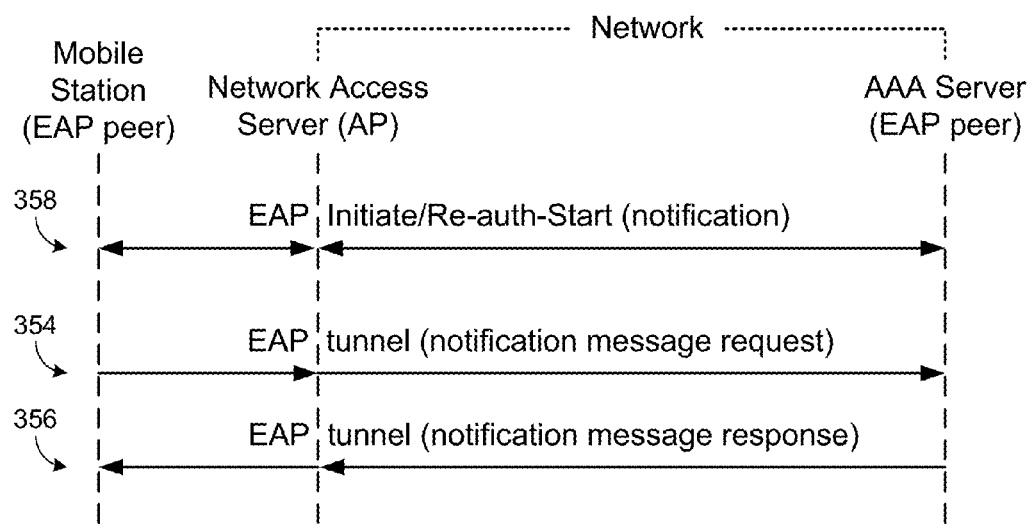

FIG. 18-1 illustrates an example message flow sequence between a mobile station, a network access server (NAS) and an AAA server. The mobile station acts as an EAP peer and the AAA server acts as an EAP peer.

The example message flow sequence comprises an EAP method exchange 352 between the mobile station and the AAA server through the NAS, an EAP tunnel message request 354 from the mobile station through the NAS to the AAA server, and an EAP tunnel message response 356 from the AAA server through the NAS to the mobile station.

EAP method exchange 352 is used to initialize the authentication exchange between the mobile station and the AAA server and open a secure tunnel.

If the network has a notification immediately available, a notification frame is returned to the mobile station as a TLV piggybacked on an authentication exchange response. If not, then the EAP Initiate/Re-auth-Start message is used as defined below with respect to FIG. 18-2, to inform the mobile station of one or more active notifications that have arrived in the AAA server.

EAP tunnel message request 354 to receive a specific notification message is piggybacked with an EAP method inside a secure tunnel. An example format for encapsulating a notification message request within an EAP-TLV follows:

```
                      Notification Message Request TLV format 0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|M|R|            TLV Type           |            Length             |
+-+-+-+-+-+-+-+-+-+-+-+-+-+-+-+-+-+-+-+-+-+-+-+-+-+-+-+-+-+-+-+-+
|                    Notification Hash (optional)...
+-+-+-+-+-+-+-+-+-+-+-+-+-+-+-+-+-+-+-+-+-+-+-+-+-+-+-+-+-+-+-+-+
``` where M, R, and TLV Type have the same meaning as for the notification frame, Length is the length of the Notification Hash field in octets, and the Notification Hash is an 8-octet field identifying the notification message being requested. If there is only one message, then the Notification Hash field may not be required.

EAP tunnel message response 356 to convey a specific notification message is piggybacked with an EAP method inside a secure tunnel. An example format for encapsulating a notification message response within an EAP-TLV follows:

```
                      Notification Message Response TLV format 0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|M|R|            TLV Type           |            Length             |
+-+-+-+-+-+-+-+-+-+-+-+-+-+-+-+-+-+-+-+-+-+-+-+-+-+-+-+-+-+-+-+-+
|                       Notification Message...
+-+-+-+-+-+-+-+-+-+-+-+-+-+-+-+-+-+-+-+-+-+-+-+-+-+-+-+-+-+-+-+-+
``` where M, R, and TLV Type have the same meaning as for the notification frame, Length is the length of the Notification Message field in octets, and the Notification Message is a field comprising the requested notification message.

FIG. 18-2 illustrates an example message flow sequence between a mobile station, a NAS and an AAA server. The mobile station acts as an EAP peer and the AAA server acts as an EAP peer.

The example message flow sequence comprises an EAP Initiate/Re-auth-Start message 358 from the AAA server through the NAS to the mobile station, EAP tunnel message request 354 from the mobile station through the NAS to the AAA server, and EAP tunnel message response 356 from the AAA server through the NAS to the mobile station.

The EAP Initiate/Re-auth-Start message is described in RFC5296 Narayanan, V., "EAP Extensions for EAP Re-authentication Protocol (ERP)", published August 2008.

In a situation where at any point in time the unsolicited notification may arrive in an uncontrolled manner, EAP Initiate/Re-auth-Start message 358 allows the EAP tunnel to be re-opened with the same security settings as those of the initial EAP method exchange.

An example format for encapsulating a notification frame within an EAP Initiate/Re-auth-Start message follows:

```
                        EAP Initiate/Re-auth-Start format
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Code      |  Identifier   |            Length             |
+-+-+-+-+-+-+-+-+-+-+-+-+-+-+-+-+-+-+-+-+-+-+-+-+-+-+-+-+-+-+-+-+
|     Type      |   Reserved    |      1 or more TVs or TLVs    ~
+-+-+-+-+-+-+-+-+-+-+-+-+-+-+-+-+-+-+-+-+-+-+-+-+-+-+-+-+-+-+-+-+
``` where one of the "1 or more TVs or TLVs" is the payload of a notification frame. TV is a Type-Value field.

The mobile station, having received a notification frame from the AAA server, may perform the method described above with respect to FIG. 6, where the retrieval of one or more notification messages is performed using EAP tunnel message request 354 and EAP tunnel message response 356. The mobile station, having received a notification frame from the AAA server, may perform the method described above with respect to FIG. 8, where the mobile station analyzes flagged notification identifier(s) to derive or identify notification messages that correspond to the flagged notification identifier(s).

Figure 19:
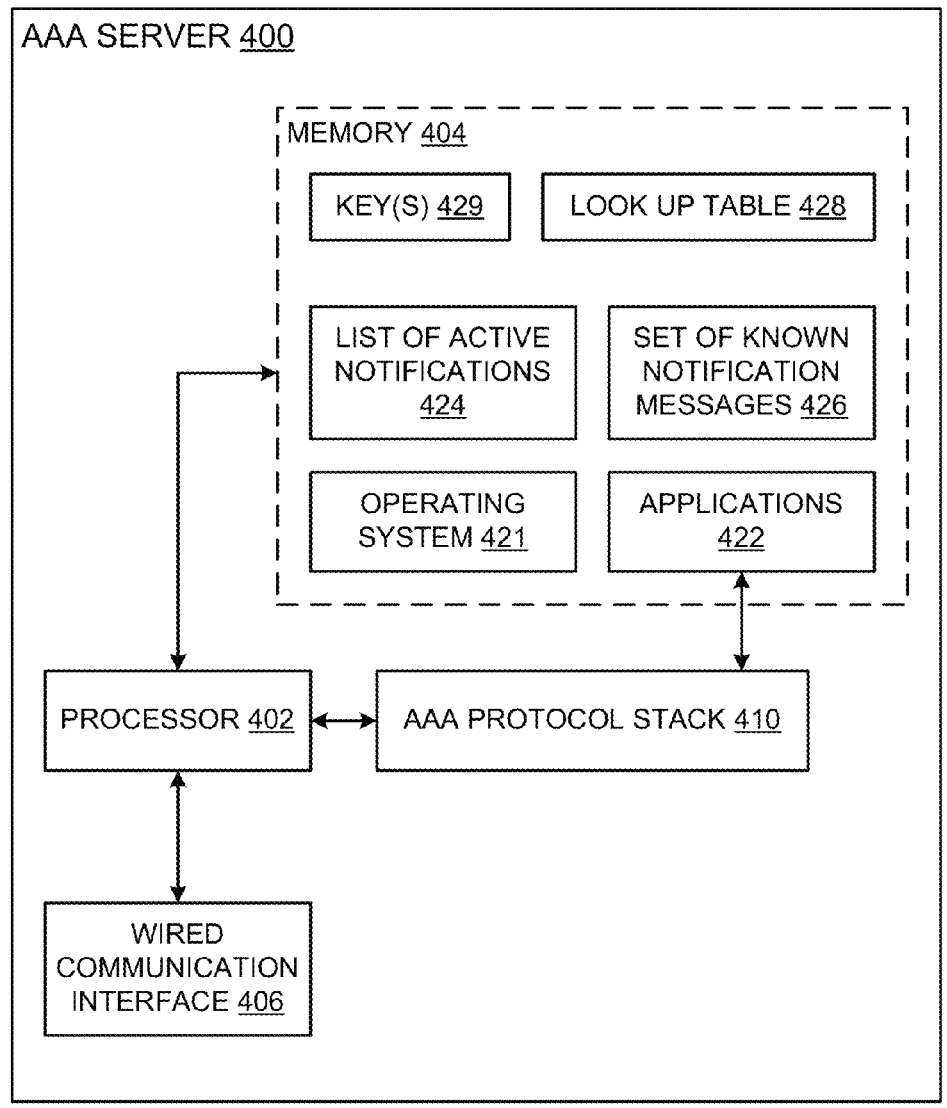
FIG. 19 is a block diagram of an example AAA server.

FIG. 19 is a block diagram of an example AAA server, for example AAA server 302. An AAA server 400 comprises a processor 402 coupled to a memory 404 and to a wired communication interface 406. AAA server 400 also comprises an AAA protocol stack 410 that is coupled to processor 402.

Memory 404 may store an operating system 421 to be executed by processor 402. Memory 404 may store applications 422 installed in AAA server 400 to be executed by processor 402. Examples of applications 422 include a notification identifier generation application as described above. Memory 404 may also store a list 424 of active notifications. The term "list" is used to aid the explanation, and it is contemplated that data structures other than a list may be used by AAA server 400 to monitor which notifications are active and hence are to be advertised.

Memory 404 may store a set 426 of notification messages that are known to a policy server and to some or all mobile stations. As explained with respect to FIG. 16-2, AAA server 400 may store previously calculated, generated or received notification identifiers. To that end, memory 404 may have a look up table (LUT) 428 in with the previously calculated, generated or received notification identifiers are stored.

Memory 404 may store one or more cryptographic keys 429. For example, a cryptographic key may be used by AAA server 400 to encrypt a notification identifier. In another example, a cryptographic key may be used by AAA server 400 to digitally sign a notification identifier. In a further example, a cryptographic key may be used by AAA server 400 as the key of a keyed hash algorithm. In yet another example, a cryptographic key may be used by AAA server 400 in the calculation of a MIC as described above with respect to FIG. 8.

AAA server 400 may comprise other elements that, for clarity, are not illustrated in FIG. 19. Similarly, AAA server 400 may comprise a subset of the elements illustrated in FIG. 19.

Figure 20:
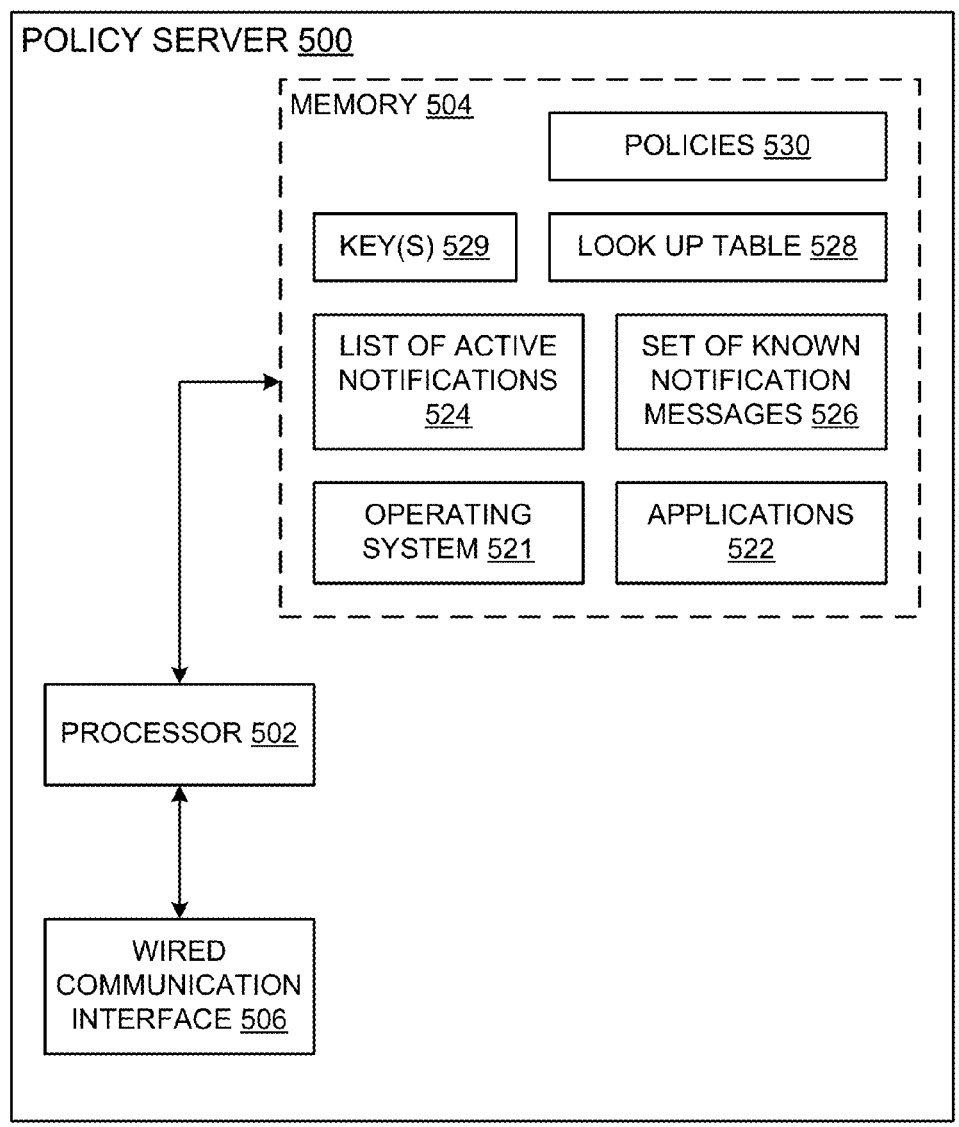
FIG. 20 is a block diagram of an example policy server.

FIG. 20 is a block diagram of an example policy server, for example policy server 314. A policy server 500 comprises a processor 502 coupled to a memory 504 and to a wired communication interface 506.

Memory 504 may store an operating system 521 to be executed by processor 502. Memory 504 may store applications 522 installed in policy server 500 to be executed by processor 502. Examples of applications 522 include a notification generation application as described above, a notification identifier generation application as described above, and an interface to permit a policy administrator to configure policies 530 and to activate messages in a set. Memory 504 may also store a list 524 of active notifications. The term "list" is used to aid the explanation, and it is contemplated that data structures other than a list may be used by policy server 500 to monitor which notifications are active and hence are to be advertised.

Memory 504 may store a set 526 of notification messages that are known to an AAA server and to some or all mobile stations. Policy server 500 may store previously calculated, generated or received notification identifiers. To that end, memory 504 may have a look up table (LUT) 528 in with the previously calculated, generated or received notification identifiers are stored.

Memory 504 may store one or more cryptographic keys 529. For example, a cryptographic key may be used by policy server 500 to encrypt a notification identifier. In another example, a cryptographic key may be used by policy server 500 to digitally sign a notification identifier. In a further example, a cryptographic key may be used by policy server 500 as the key of a keyed hash algorithm. In yet another example, a cryptographic key may be used by policy server 500 in the calculation of a MIC as described above with respect to FIG. 8.

Policy server 500 may comprise other elements that, for clarity, are not illustrated in FIG. 20. Similarly, policy server 500 may comprise a subset of the elements illustrated in FIG. 20.

Application of EAP Implementation to WLAN

The NAS described above with respect to the EAP Implementation may be a WLAN AP, and the mobile station described above with respect to the EAP Implementation may be a STA within range of the WLAN AP. Communications in the EAP tunnel traverse the NAS. The STA will receive notification frames from the AAA server, send notification message requests to the AAA server, and receive notification message responses from the AAA server in a manner that is transparent to the NAS, as described above.

It is also contemplated that the AAA server may be able to convey some or all of the contents of its list of active notifications to the AP, for inclusion in the AP's list of active notifications. This is explained above with respect to FIG. 2-1, which states that an AP may receive a notification message and its notification identifier from an external source, for example, from a server coupled to the AP. The external source may be the AAA server. For clarity, these will be termed "AAA-server-originated-notifications" even though they may have been received by the AAA server from another source, for example, from a policy server. The notifications in the AP's list of active notifications, one or more of which may be AAA-server-originated-notifications, will be advertised to STAs within range of the AP as described above. STAs which are not compatible with the EAP framework will receive advertisements of the AAA-server-originated-notifications only from the AP. Any of the STAs which are compatible with the EAP framework will receive advertisements of the AAA-server-originated-notifications from the AAA server as described above with respect to the EAP implementation and from the AP.

Comparison to Emergency Alert System (EAS)

In an emergency situation, authorities want to alert people to dangers associated with the emergency situation or to solicit their assistance or both. For example, in the event of a natural disaster such as an earthquake or hurricane, or in the event of an accident such as derailment of a train carrying toxic materials, the authorities may want to alert people to the situation and instruct them to remain indoors or to travel to a safer location. In another example, if a child has been abducted and information identifying the abductor or the abductor's vehicle is available, the police may issue an alert to the public to solicit the public's assistance in locating the child.

Emergency Alerts are traditionally transmitted through mainstream broadcast media such as television stations and radio stations. To reach even more people, it is desirable to broadcast emergency alerts to individuals via their cellular telephones and other mobile communication devices.

IEEE 802.11u Draft 9.0 describes support for the Emergency Alert System (EAS), defined in that document as a US national public warning system. The EAS support allows access points (APs) of a wireless local area network (WLAN) to disseminate emergency alert notifications from an external network to non-AP stations (STAs). Availability of an EAS message is advertised by an AP in its Beacon and Probe Response frames, so that non-AP STAs can be informed of the availability of the EAS message whether in the associated state or in the non-associated state.

Section 11.23.7 of IEEE 802.11u Draft 9.0 explains the EAS support from an interworking perspective:

"When the IEEE 802.11 infrastructure is informed of the availability of an EAS message (the mechanism by which is out of scope of this standard), an AP with dot11EASEnabled set to TRUE shall advertise the availability of the EAS message by including an Emergency Alert Identifier element . . . for that message in its Beacon and Probe Response frames. The AP shall include one instance of an Emergency Alert Identifier element in its Beacon and Probe Response frames for each active EAS Message. The Emergency Alert Identifier element provides an Alert Identifier Hash value, a unique indicator of the EAS Message of the alert to the non-AP STA. The Alert Identifier Hash value allows the non-AP STA to determine whether this is a new alert . . . . When an EAS Message has expired (the mechanism by which is out of scope of this standard), an AP with dot11EASEnabled set to TRUE shall remove the corresponding instance of an Emergency Alert Identifier element from its Beacon and Probe Response frames . . . .

After receiving an Alert Identifier Hash value for an EAS Message which has not already been retrieved from the network, a non-AP STA having dot11EASEnabled set to TRUE shall retrieve the EAS message from the AP either: using the GAS procedures defined in . . . with Advertisement Protocol ID set to the value for EAS . . . , indicating to the AP the Alert Identifier Hash of the message it wants to retrieve, or for a non-AP STA in the associated state, retrieve the EAS message using a URI (the mechanism by which the URI is out of scope of this standard). The non-AP STA retrieves the Emergency Alert Server URI . . . . With this Emergency Alert Server URI, the STA could form a URI by concatenating the Emergency Alert Server URI with the hexadecimal numerals of the Alert Identifier Hash converted to UTF-8 encoded characters and the '.xml' file extension. For example, if the Emergency Alert Server URI is http://eas.server.org and the Alert Identifier Hash is '0x1234567890abcdef', then the URI would be 'http://eas.server.org/1234567890abcdef.xml'."

It is contemplated in informative Annex W of IEEE 802.11u Draft 9.0:

"A traveler has enabled display of Emergency Alerts on their wireless device (non-AP STA), by appropriate setting of the higher-layer emergency alert application on their device. . . . During the steps leading up to association, the device, when it becomes aware of an Emergency Alert, will obtain and display it."

In other words, the sole effect on the wireless device of receiving the EAS message, as contemplated in IEEE 802.11u Draft 9.0, is for the wireless device to display the emergency alert message. Persons of ordinary skill in the art would further contemplate that the higher-layer emergency alert application, upon having downloaded an EAS message, may cause the wireless device to produce audible sound or to vibrate or both in order to attract the attention of the person in possession of the wireless device.

It is neither taught nor suggested in IEEE 802.11u Draft 9.0 or its predecessors that the content of the EAS message modify or influence the behavior of the wireless device. Rather, the wireless device is a means for alerting a person to the emergency situation. Processing of an EAS Identifier element (as described in IEEE 802.11u Draft 9.0) is a consequence of having received a Beacon frame or Probe Response frame advertising the availability of an EAS message. Displaying the EAS message is a consequence of having downloaded the EAS message, and is done by the wireless device without any regard for the specific content of the downloaded EAS message. Other than the processing of the EAS Identifier element, the downloading of the EAS message and the display of the downloaded EAS message, no modification of or influence on the behavior of the wireless device due to the existence of the EAS message is described in IEEE 802.11u Draft 9.0.

It should also be noted that, as contemplated in IEEE 802.11u Draft 9.0 and its predecessors, the availability of an EAS message and the content of the EAS message are related to a wide-scale emergency situation, and it is the authorities who determine when to issue an EAS message and its content. The availability of the EAS message in and of itself does not convey any specific information about the WLAN or about the AP that advertised the availability of the EAS message, and the content of the EAS message does not convey any specific information about the WLAN or about the AP that advertised the availability of the EAS message.

The EAS support described in IEEE 802.11u Draft 9.0 and its predecessors applies only to EAS messages issued as part of the US national public warning system. The EAS support cannot be used to convey notification messages generated by an administrator of the WLAN or generic notifications received in the WLAN from an external source other than the US national public warning system.

Conclusion

While certain features have been illustrated and described herein, many modifications, substitutions, changes, and equivalents will now occur to those of ordinary skill in the art without departing from the fair meaning of the accompanying claims.

What is claimed is:

1. A method for handling a received advertisement of a notification, the method to be performed in a wireless local area network (WLAN) station (STA), the method comprising:
   receiving, prior to associating with the WLAN, downlink frame including a notification information element that includes a notification identifier and a type value that comprises an indication as to whether the notification identifier refers to either a notification or information of another type;
   checking whether the notification identifier was previously received by the WLAN STA; and
   attempting to retrieve a notification message corresponding to the notification identifier when the notification identifier was not previously received by the WLAN STA.

2. The method as claimed in claim 1, wherein the WLAN STA is not associated with a WLAN access point (AP) that sent the downlink frame, and wherein attempting to retrieve the notification message comprises:
   transmitting in a manner receivable by the WLAN AP an Access Network Query Protocol (ANQP) query that includes the notification identifier.

3. The method as claimed in claim 1, wherein the WLAN STA is associated with a WLAN access point (AP) that sent the downlink frame, and wherein attempting to retrieve the notification message comprises:
   invoking a notification application installed in the WLAN STA to retrieve the notification message.

4. The method as claimed in claim 1, wherein the notification identifier was not previously received by the WLAN STA, the method further comprising:
   analyzing the notification identifier to derive the notification message from the notification identifier.

5. The method as claimed in claim 1, wherein the notification identifier was not previously received by the WLAN STA, the method further comprising:
   storing a set of notification messages; and
   analyzing the notification identifier to determine which, if any, of the notification messages in the set corresponds to the notification identifier.

6. A wireless local area network (WLAN) station (STA) comprising:
   an antenna;
   a WLAN interface coupled to the antenna;
   a processor;
   a memory coupled to the processor, the memory storing a control application, which, when executed by the processor, acts on a notification message for which an advertisement was received by the WLAN interface,
   an audio output element coupled to the processor,
   wherein the control application acting on the notification message mutes the audio output element;
   wherein the advertisement comprised a notification information element that included a notification identifier corresponding to the notification message and a type value that comprises an indication as to whether the notification identifier includes either a notification or information of another type.

7. A wireless local area network (WLAN) station (STA) comprising:
   an antenna;
   a WLAN interface coupled to the antenna;
   a processor;
   a memory coupled to the processor, the memory storing a control application, which, when executed by the processor, acts on a notification message for which an advertisement was received by the WLAN interface,
   a vibrating component coupled to the processor,
   wherein the control application acting on the notification message sets an alert function of the WLAN STA to the vibrating component;
   wherein the advertisement comprised a notification information element that included a notification identifier corresponding to the notification message and a type value that comprises an indication as to whether the notification identifier includes either a notification or information of another type.

* * * * *